United States Patent
Carns et al.

(10) Patent No.: US 6,848,720 B2
(45) Date of Patent: Feb. 1, 2005

(54) SHROUDED FLUID-CONDUCTING APPARATUS

(75) Inventors: James A. Carns, Wichita, KS (US); Theron L. Cutler, Wichita, KS (US); Mark A. Shelly, Bel Aire, KS (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/215,498

(22) Filed: Aug. 9, 2002

(65) Prior Publication Data

US 2004/0026922 A1 Feb. 12, 2004

(51) Int. Cl.[7] .............................. F16L 7/00; F16L 35/00
(52) U.S. Cl. .............................. 285/123.15; 285/123.3; 285/13; 285/14; 285/93
(58) Field of Search .................... 285/123.1, 123.15, 285/123.16, 123.3, 93, 13, 14, FOR 113

(56) References Cited

U.S. PATENT DOCUMENTS

| | | | | |
|---|---|---|---|---|
| 724,675 A | * | 4/1903 | Decker ................... | 285/123.15 |
| 2,475,635 A | * | 7/1949 | Parsons .................. | 285/123.15 |
| 2,668,066 A | * | 2/1954 | Stadelhofer .................. | 285/363 |
| 3,928,903 A | * | 12/1975 | Richardson et al. ....... | 29/407.1 |
| 4,149,739 A | * | 4/1979 | Morris .................. | 285/123.15 |
| 4,929,000 A | * | 5/1990 | Annestedt, Sr. ........ | 285/123.16 |
| 5,449,203 A | * | 9/1995 | Sharp ..................... | 285/123.15 |
| 5,449,204 A | * | 9/1995 | Greene et al. ......... | 285/123.15 |
| 6,302,448 B1 | * | 10/2001 | Van Der Meer et al. ......... | 285/123.15 |
| 6,428,054 B1 | * | 8/2002 | Zappa et al. ........... | 285/123.15 |

FOREIGN PATENT DOCUMENTS

| | | | | |
|---|---|---|---|---|
| DE | 2744674 A | * | 4/1979 | ......... 285/FOR 113 |
| WO | WO 85/02003 | * | 5/1985 | ......... 285/FOR 113 |

* cited by examiner

Primary Examiner—James M. Hewitt
(74) Attorney, Agent, or Firm—Harness Dickey & Pierce P.L.C.

(57) ABSTRACT

A shrouded fluid-conducting apparatus is provided that includes at least one outer conduit and at least one inner conduit disposed within the outer conduit. Preferably, the shrouded fluid-conducting apparatus further includes at least one shrouded end fitting disposed at an end of the shrouded fluid-conducting apparatus and at least one support member engaged with the inner and outer conduits. The shrouded end fitting allows the shrouded fluid-conducting apparatus to be engaged with an additional shrouded fluid-conducting apparatus. The support member allows for the transfer of loads from the inner and/or outer conduits to one or more components external to the shrouded fluid-conducting apparatus. Accordingly, the shrouded-fluid conducting apparatus may be used to transport fuel through an aircraft "ignition zone" in an FAA-compliant manner.

34 Claims, 14 Drawing Sheets

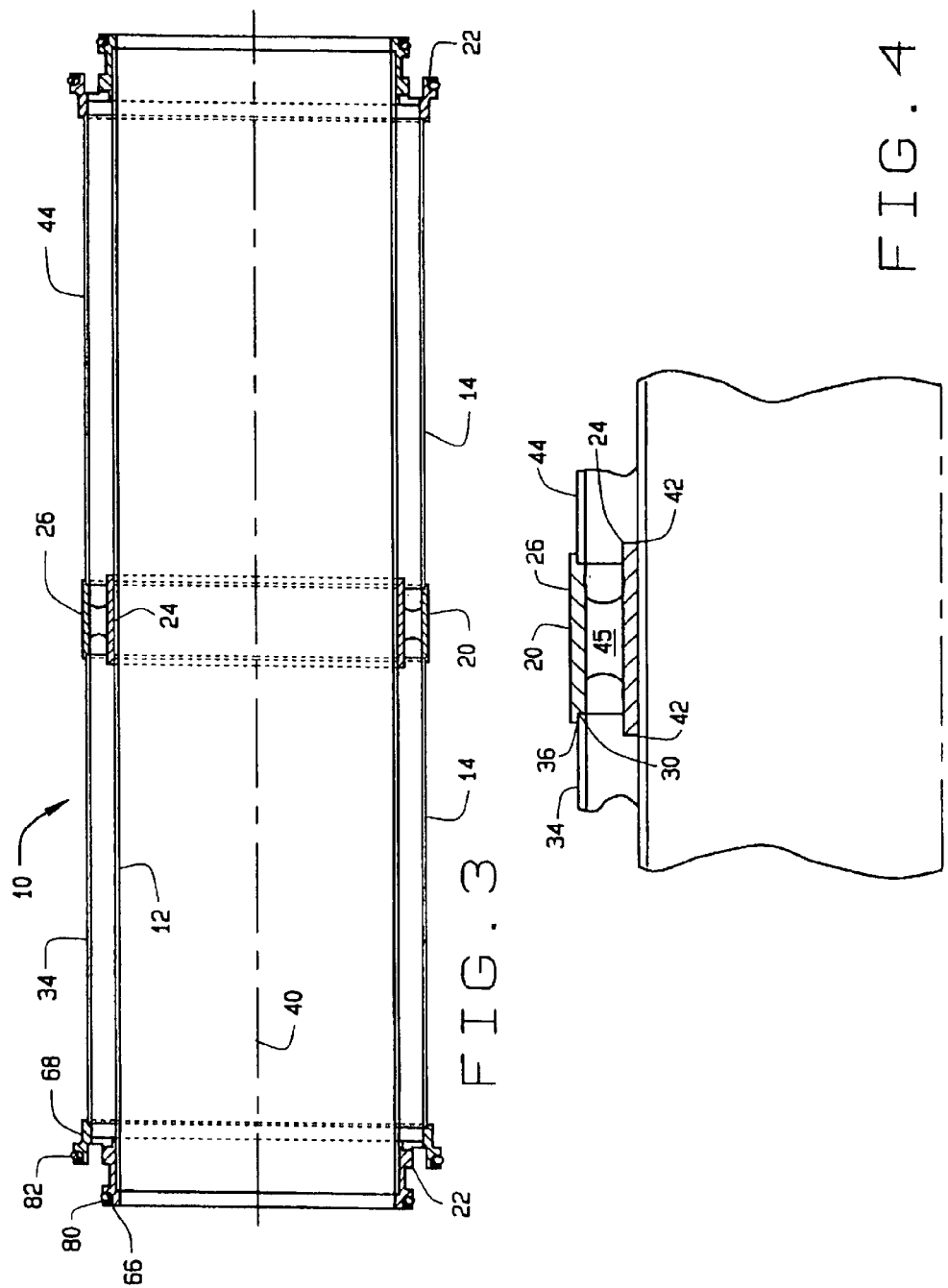

SHROUDED FLUID-CONDUCTING APPARATUS

FIELD OF THE INVENTION

The present invention relates generally to fluid-conducting apparatus and more particularly to methods and apparatus for conducting fuel in aircraft.

BACKGROUND OF THE INVENTION

According to Federal Aviation Administration (FAA) regulations, fuel lines (e.g., manifolds, conduits) that conduct or transport fuel through areas classified by the FAA as "ignition zones" (e.g., pressurized areas) must be shrouded and capable of being drained. The applicable sections of the FAA requirements relative to fuel lines in aircraft ignition zones for transport category airplanes are contained in 14 C.F.R. Part 25, the pertinent parts of which are set forth below.

For example, Section 25.855 states in pertinent part that "for each cargo and baggage compartment not occupied by crew or passengers . . . no compartment may contain any controls, wiring, lines, equipment, or accessories whose damage or failure would affect safe operation, unless those items are protected so that . . . they cannot be damaged by the movement of cargo in the compartment, and . . . their breakage or failure will not create a fire hazard." Section 25.863 states in pertinent part that "in each area where flammable fluids or vapors might escape by leakage of a fluid system, there must be means to minimize the probability of ignition of the fluids and vapors, and the resultant hazards if ignition does occur." Section 25.901 states in pertinent part that "for each power plant and auxiliary power unit installation, it must be established that no single failure or malfunction or probable combination of failures will jeopardize the safe operation of the airplane except that the failure of structural elements need not be considered if the probability of such failure is extremely remote." Section 25.967 states in pertinent part that "each fuel tank must be isolated from personnel compartments by a fumeproof and fuelproof enclosure."

To summarize, the FAA regulations ensure that no single failure will jeopardize safe operation of the aircraft, as would be the case if single-wall fuel manifolds were used in aircraft "ignition zones." That is, a leak or rupture in a single-wall fuel manifold would allow fuel to enter the "ignition zone", which could result in catastrophic event were the fuel to ignite or explode.

To comply with the FAA shrouded fuel line requirements, several methods have been employed. One method involves the installation of a hose inside a tube. To be compatible with the present aerial refueling manifold which includes a five-inch (5.0") outside diameter duct, this concept requires the hose to be disposed within a twelve inch (12.0") outside diameter tube. Due to space limitations aboard aircraft, however, the relatively large outside diameter required for the outer tube has rendered this hose-in-tube concept impracticable.

In another effort at least in part to satisfy the FM shrouded fuel line requirements, an alternative method has involved placing an inner tube in a second tube without any means for supporting the inner tube. Accordingly, the inner tube in this concept is unable to transfer loads to the outer tube and/or to components external thereto and is thus not viable.

SUMMARY OF THE INVENTION

Accordingly, a need remains for an FAA-compliant device and method for transporting fuel through an aircraft "ignition zone" that is not space or cost prohibitive. Ideally, the device would allow for the transfer of loads from the device to one or more components external to the device.

In one form, the present invention provides a shrouded fluid-conducting apparatus that includes at least one outer conduit and at least one inner conduit disposed within the outer conduit. Preferably, the shrouded fluid-conducting apparatus further includes at least one shrouded end fitting disposed at an end of the shrouded fluid-conducting apparatus and at least one support member engaged with the inner and outer conduits. The shrouded end fitting allows the shrouded fluid-conducting apparatus to be engaged with an additional shrouded fluid-conducting apparatus. The support member allows for the transfer of loads from the inner and/or outer conduits to one or more components external to the shrouded fluid-conducting apparatus. Accordingly, the shrouded fluid-conducting apparatus may be used to transport fuel through an aircraft "ignition zone" in an FAA-compliant manner.

In another form, the present invention provides a method of manufacturing or making a shrouded fluid-conducting apparatus. Generally, the method comprises the steps of: disposing at least one inner conduit within at least one outer conduit; engaging at least one support member with the inner and outer conduits; and engaging at least one shrouded end fitting with an end of the shrouded fluid-conducting apparatus.

In yet another form, the present invention provides a method for conducting fluid. Generally, the method comprises the steps of: shrouding at least one inner conduit, for example, by disposing the inner conduit within an outer conduit; allowing the inner conduit to transfer a load to an external component; placing the inner conduit in fluid communication with at least one other fluid-conducting apparatus; and delivering fluid to the inner conduit. To allow for coaxial fluid flow, the method may further comprise the step of delivering fluid to the outer conduit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will be more fully understood from the detailed description and the accompanying drawings, wherein:

FIG. 3 is a cross-sectional view of the shrouded fluid-conducting apparatus taken along the plane 3—3 in FIG. 1;

FIG. 4 is a detailed cross-sectional view of portions of the support member and inner and outer conduits of the shrouded fluid-conducting apparatus shown in FIG. 3;

DETAILED DESCRIPTION OF THE PREFERRED EMBODIMENTS

Figure 1:
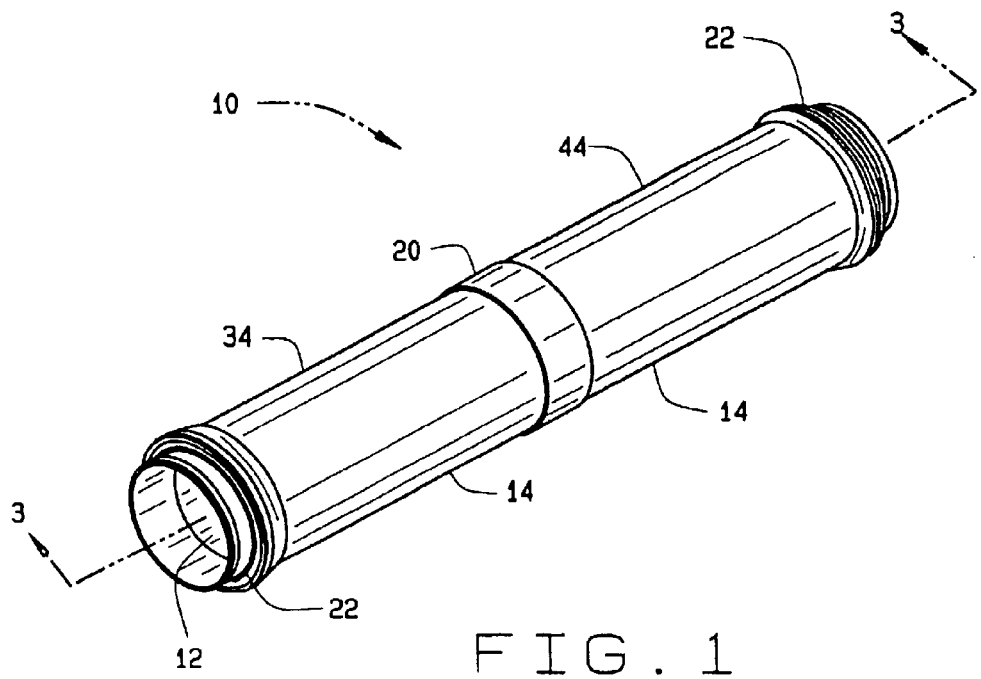
FIG. 1 is a perspective view of a shrouded fluid-conducting apparatus constructed in accordance with the principles of the present invention.

The following description of the preferred embodiments is merely exemplary in nature and is in no way intended to limit the invention, its application, or uses. For example, it is anticipated that the invention will be applicable to any of a wide range of aircraft (e.g., but not limited to, fighter jets, commercial jets, private jets, propeller powered airplanes, among others) regardless of the manner in which the aircraft is piloted (e.g., directly, remotely, via automation, or in a combination thereof, among others). Indeed, the present invention need not even be limited to aircraft. Accordingly, the specific references to aircraft herein should not be construed as limiting the scope of the present invention. In addition, it is also anticipated that the invention will be applicable to any of a wide range of fluids, e.g., gases and liquids, regardless of whether the fluid is being used as a fuel. Accordingly, the specific references to fuel, gases, or liquids herein should not be construed as limiting the scope of the present invention.

In addition, certain terminology will also be used in the following description for the purpose of reference only, and thus are not intended to be limiting. For example, terms such as "upper", "lower", "above", and "below" refer to directions in the drawings to which reference is made. Terms such as "front", "back", "rear", and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

FIG. 1 is a perspective view of a shrouded fluid-conducting apparatus generally indicated by reference number 10, according to one preferred embodiment of the present invention. Generally, the shrouded fluid-conducting apparatus 10 comprises at least one inner conduit 12 and at least one outer conduit 14 disposed around the inner conduit 12. The outer conduit 14 includes a lumen that is sized to receive the inner conduit 12. The inner conduit 12 includes a lumen that allows for a fluid flow (e.g., gases and liquids) flow through the inner conduit 12. The outer conduit 14 shrouds the inner conduit 12 to contain any fluid leaking from the inner conduit 12 and thus prevent the leaking fluid from reaching the compartment in which the shrouded fluid-conducting apparatus 10 is being used. Accordingly, the inner and outer conduits 12 and 14 must both fail before a fluid being conducted through the inner conduit 12 can reach the compartment or space in which the shrouded fluid-conducted apparatus 10 is being used. The shrouded fluid-conducting apparatus 10 thus allows a fluid to be conducted through the inner conduit 12 under a double failure condition.

As further shown in FIG. 1, the shrouded fluid-conducting apparatus 10 may include at least one support member 20. The various embodiments 20 and 120 of the support member are described in greater detail below. Briefly, however, the inner conduit 12 may be inclined to move or shift within the outer conduit 14 while a fluid is being conducted through the inner conduit 12. The support member 20 prevents, or at least reduces, the movement of the inner conduit 12 within the outer conduit 14. In other words, the support member 20 holds or keeps the inner conduit 12 substantially stationary with respect to the outer conduit 14. Without the support member 20, a sufficiently high pressure within the inner conduit 12 could cause the inner conduit 12 to strike or impact the outer conduit 14 with sufficient force to damage either or both of the conduits 12 and 14. Accordingly, the support member 20 increases the stability and useful life of the shrouded fluid-conducting apparatus 10. In addition, and as described in greater detail below, the support member 20 may also allow for the installation of at least a portion of a fluid control system, allow for curvature of the shrouded-fluid-conducting apparatus 10, and/or allow for loads to be transferred from the shrouded fluid-conducting apparatus 10 to an external component (e.g., ceiling joists, floor beams, and other load-bearing structures).

Figure 13:
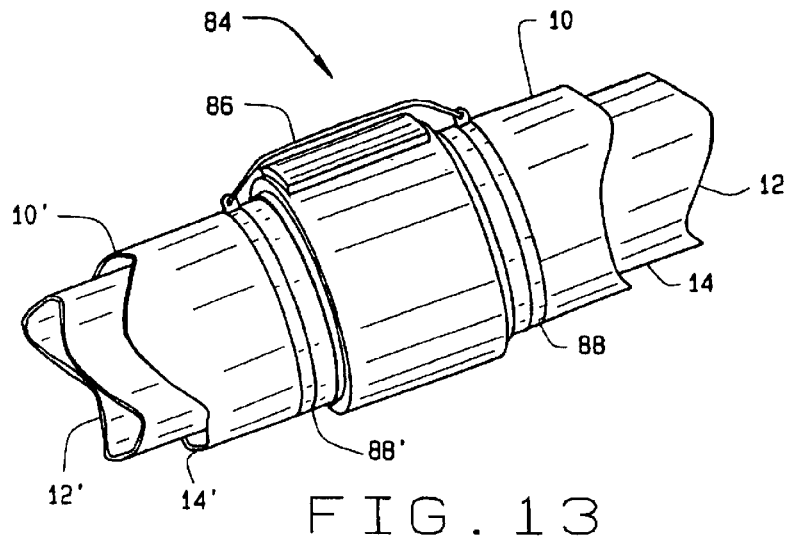
FIG. 13 is a perspective view showing a first embodiment of a joint that may be used to engage a shrouded fluid-conducting apparatus with an additional shrouded fluid-conducting apparatus in accordance with the principles of the present invention.
Figure 14:
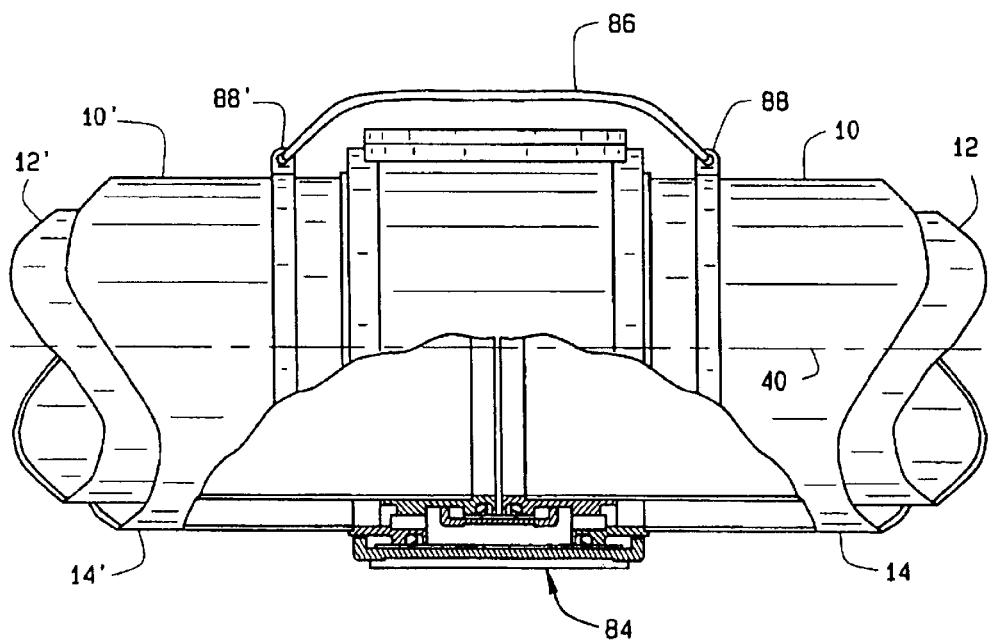
FIG. 14 is a cutaway side view of the joint shown in FIG. 13.
Figure 15:
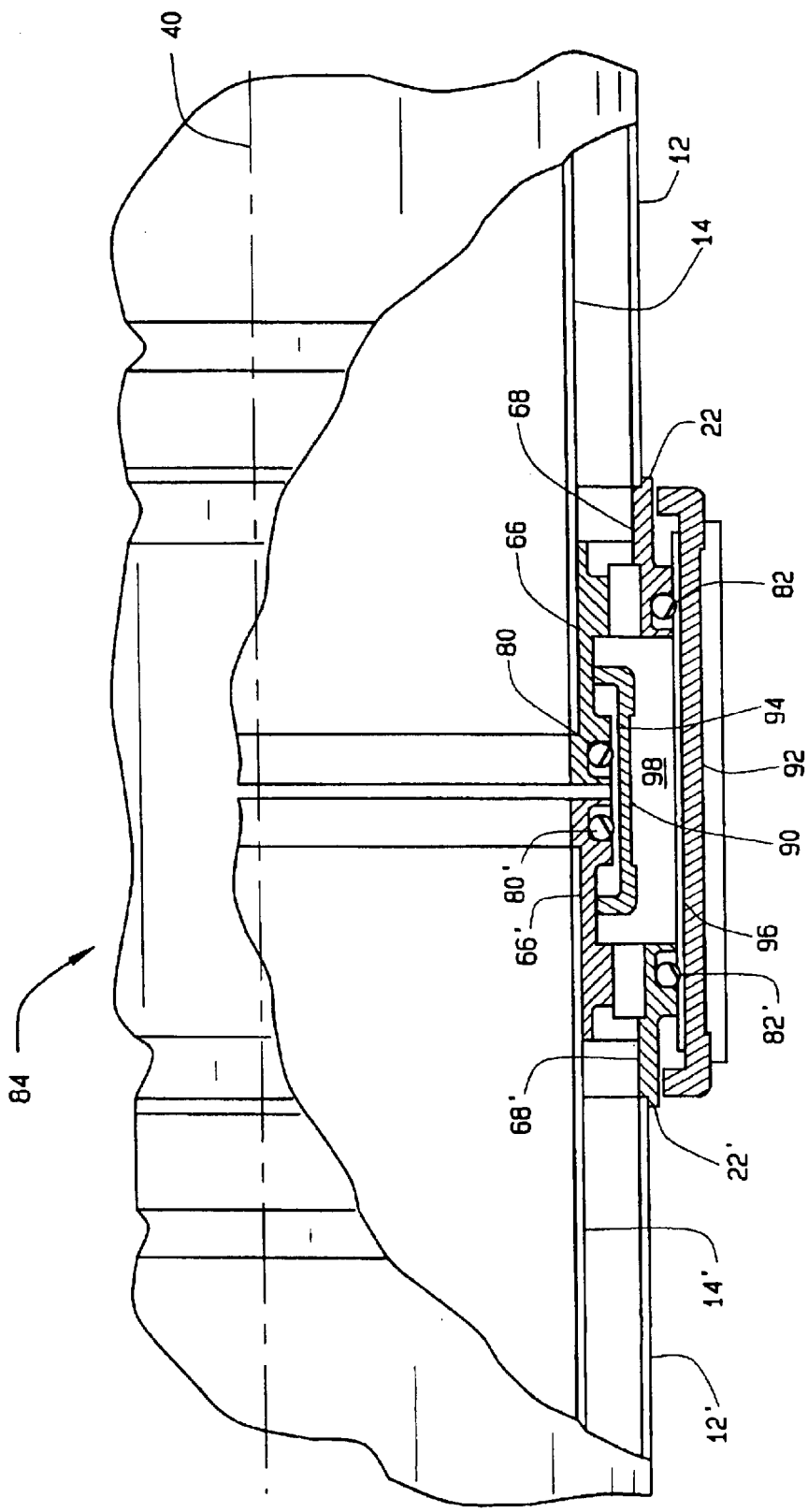
FIG. 15 is a detailed cutaway side view of a portion of the joint shown in FIG. 14.

Still referring to FIG. 1, at least one shrouded end fitting 22 may be disposed at an end of the shrouded fluid-conducting apparatus 10. Preferably, however, a shrouded end fitting 22 is disposed at each end of the shrouded fluid-conducting apparatus 10. The various embodiments 22, 222, 223 of the shrouded end fittings are described in greater detail below. Briefly, however, the shrouded end fittings 22 may be used to connect the shrouded fluid-conducting apparatus 10 to an additional shrouded fluid-conducting apparatus 10', as shown in FIGS. 13 through 15. Alternatively, the shrouded fluid-conducting apparatus 10 may be connected by way of the shrouded end fittings 22 to any one of a wide range of other fluid-conducting apparatus having end fittings mateable or engageable with the shrouded end fittings 22, as would be obvious to one having ordinary skill in the art after having become familiar with the teaching of the present invention. The shrouded end fittings 22 may also be used to hold or keep the inner conduit 12 substantially stationary with respect to the outer conduit 14 and/or to transfer loads from the inner and outer conduits 12 and 14 to an external component (e.g., ceiling joists, floor beams, and other load-bearing structures).

It should be noted that although the Figures show a single support member 20, 120 disposed between two shrouded end fittings 22, 222, 223, such need not be the case. For example, the shrouded fluid-conducting apparatus may comprise a plurality of (i.e., two or more) support members disposed between the two shrouded end fittings.

Figure 2:
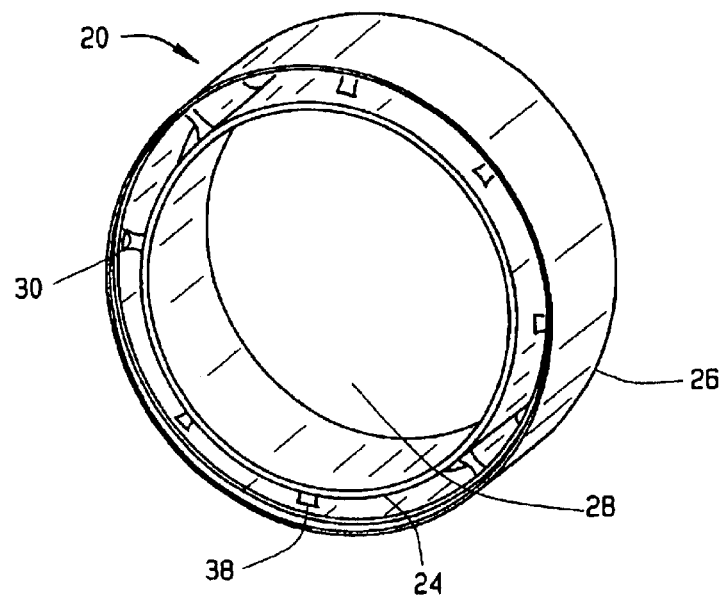
FIG. 2 is a perspective view of the support member of the shrouded fluid-conducting apparatus shown in FIG. 1.

FIG. 2 is a perspective view of the support member 20. As shown, the support member 20 preferably comprises concentric annular-shaped or ring-like members 24 and 26. The inner and outer ring-like members 24 and 26 are separated by a spaced distance and accordingly define a leak detection passageway 45, as shown in FIG. 4. The leak detection passageway 45 allows for a fluid flow between the inner and outer ring-like members 24 and 26.

Referring back to FIG. 2, the support member 20 may further include a plurality of spokes, webs, or fins 38 that are disposed between the inner and outer ring-like members 24 and 26. The inner ring-like member 24 includes a central opening 28 that is sized to receive the inner conduit 12.

The outer ring-like member 26 is sized to be disposed around an end portion of the outer conduit 14. Each end of the outer ring-like member 26 may be provided with a notch or weld socket 30 sized to allow the outer conduit portion 34 to be welded therein, as shown in FIG. 4.

When assembled, the support member 20 may have a twofold purpose. First, the support member 20 may be used to hold the inner conduit 12 substantially stationary with respect to the outer conduit 14. That is, the support member 20 may be used to compensate for or overcome the inclination of the inner conduit 12 to move or shift within the outer conduit 14 while the inner conduit 12 is conducting fluid. In addition, the support member 20 may also be used to allow for the transfer of loads from the inner and outer conduits 12 and 14 to an external component. Specifically, the inner conduit 12 may transfer loads arising from, for example, the weight of the inner conduit 12 and the weight of the fluid conducted thereby, to the support member 20. The support member 20 may then transfer those loads to a component external to the shrouded fluid-conducting apparatus 10 to which the support member 20 may be engaged. Accordingly, the fins 38 of the support member 20 are preferably sized according to the loads that will be transferred thereto by the inner conduit 12.

In addition, at least one fin 38 may be configured for allowing installation of at least a portion or a component of a fluid control system therein. For example, the fin 38 may be sufficiently thick to allow a passageway (e.g., threaded hole or bore) to be provided therethrough. If so, the shrouded fluid-conducting apparatus 10 may then be provided with a passageway that extends through each of the outer ring-like member 26, the fin 38, the inner ring-like member 24 and the inner conduit 12. The passageway may then be used for installing a union or pipe coupling, a drain, a pressure regulator/monitor, among other components of a fluid control system in a manner similar to that shown in FIGS. 23 through 25, which illustrate the union 141 installed in the passageway 139 extending through the inner and outer ring-like members 124, 126 and the fin 138 of support member 120.

Installation of a drain would allow for the removal of fluid from the inner conduit 12 thereby making the removal, repair, and/or replacement of the inner conduit 12 easier. Installation of a pressure regulator/monitor would allow for the pressure within the inner conduit 12 to be monitored and regulated. Depending on the pressure within the inner conduit 12, the pressure regulator/monitor could send commands to a switch control for the pumps providing the fluid pressure to the inner conduit 12 to either increase, decrease, or maintain pressure. In either case, the passageway provided through the support member 20 and the inner conduit 12 might be capped with a heater coil and a plug (e.g., a threaded plug).

FIG. 3 is a cross-sectional view of the shrouded fluid-conducting apparatus 10 taken along the plane 3—3 shown in FIG. 1. Although the manner in which the support member 20 may be engaged with the inner and outer conduits 12 and 14 is shown FIG. 3, it is best shown in FIG. 4. FIG. 4 is a detailed cross-sectional view of an upper portion (i.e., the portion disposed above the center line 40) of the support member 20 shown engaged with the inner and outer conduits 12 and 14.

Referring to FIGS. 3 and 4, the support member 20 and the conduits 12 and 14 may be assembled in the following manner. First, the support member 20 is slidably positioned or disposed around the inner conduit 12, which preferably comprises a single continuous member. As shown, the inner conduit 12 is positioned within the inner ring-like member 24 of support member 20.

Next, the inner conduit 12 and inner ring-like member 24 are attached or secured to one another. For example, a compatible filler material may be used to weld (e.g., fillet weld, butt weld, etc.) the inner conduit 12 and inner ring-like member 24 to each other at any number of (i.e., one or more), but preferably at least two, locations thus creating weld joints 42. Or for example, an adhesive may be used to secure the inner conduit 12 to the inner ring-like member 24. Alternatively, other methods for attaching the inner conduit 12 to the inner ring-like member 24 are possible as would be obvious to one having ordinary skill in the art after having become familiar with the teachings of the invention.

After the inner conduit 12 has been attached to the inner ring-like member 24, the outer conduit 14 is attached or secured to the outer ring-like member 26. As shown, the outer conduit 14 comprises a first portion 34 and a second portion 44 between which is disposed the outer ring-like member 26. The outer conduit portions 34 and 44 may be each welded (e.g., fillet weld, butt weld, etc.) to a corresponding weld socket 30 in the outer ring-like member 26 thus forming weld joints 36 between the support member 20 and the corresponding outer conduit portions 34 and 44. Alternatively, other methods for attaching the outer conduit portions 34 and 44 to the outer ring-like member 26 may be possible as would be obvious to one having ordinary skill in the art after having become familiar with the teachings of the invention.

The inner and outer ring-like members 24 and 26 are preferably separated by a spaced distance and accordingly define the leak detection passageway 45. The leak detection passageway 45 provides fluid communication between the outer conduit portions 34 and 44. That is, the leak detection passageway 45 allows a fluid to flow from the outer conduit portion 34 or 44 into the other outer conduit portion 34 or 44.

Preferably, a leak detection system is provided that is capable of detecting the presence of a leak in the inner conduit 12 and providing an appropriate warning thereof. For example, the leak detection system may detect the presence of a fluid within the outer conduit 14. Or for example, the leak detection system may monitor the pressure within the outer conduit 14 and provide a warning if the pressure changes as a result of, for example, a fluid leaking into the outer conduit 14 from the inner conduit 12. Because of the leak detection passageway 45, a leak detection system is not necessarily needed for each of the outer conduit portions 34 and 44. Instead, a single leak detection system provided along either conduit portion 34 or 44 may be used to detect fluid in either of the outer conduit portions 34 or 44. In one embodiment, the leak detection system may comprise a weld boss that is welded to the outer conduit portion 34, wherein pressure sensors or early detection lines are provided on the weld boss.

Any of wide range of materials and manufacturing processes may be used to produce the support member 20. The selection of material may depend at least in part on the materials comprising the inner and outer conduits 12 and 14 and the manner in which the inner and outer conduits 12 and 14 will be engaged with the support member 20. The selection of manufacturing process may depend at least in part on the material that is selected for the support member 20. Preferably, the support member material is preferably compatible with the conduit material(s), the method (e.g., welding) used to engage the support member 20 with the inner and outer conduits 12 and 14, and the method used to make the support member 20. By way of example only, the support member 20 may comprise aluminum (e.g., 6061-T4 aluminum) or stainless steel and be formed by a machining or milling process.

Figure 5:
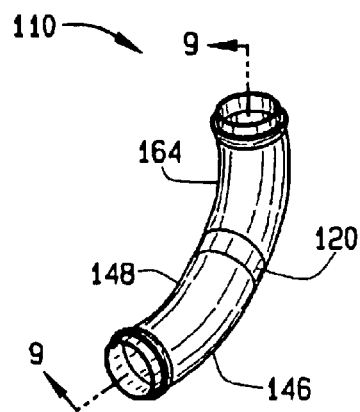
FIG. 5 is a perspective view of a second embodiment of a shrouded fluid-conducting apparatus including a second embodiment of a support member constructed in accordance with the principles of the present invention.
Figure 6:
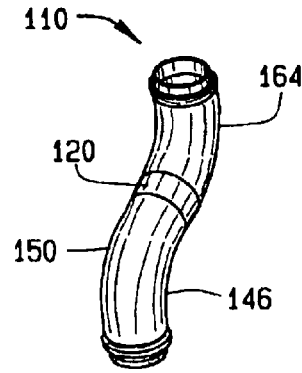
FIG. 6 is another perspective view of the shrouded fluid-conducting apparatus shown in FIG. 5 with its lower portion disposed in a second position.
Figure 7:
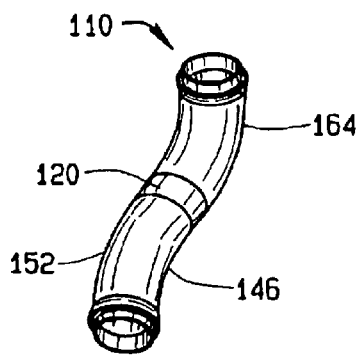
FIG. 7 is yet another perspective view of the shrouded fluid-conducting apparatus shown in FIG. 5 with its lower portion disposed in a third position.

FIGS. 5, 6 and 7 are each perspective views of a second embodiment of a shrouded fluid-conducting apparatus 110 in which a portion 146 thereof that is disposed below the support member 120 is shown in respective first, second, and third positions 148, 150, 152. The portion 164 of the shrouded fluid-conducting apparatus 110 disposed above the support member 120 is shown to be essentially in the same position in FIGS. 5 through 7.

The shrouded fluid-conducting apparatus 110 includes curved or bent inner and outer conduits 112 and 114. To accommodate for the curvatures in the inner and outer conduits 112 and 114, the second embodiment of the support member 120 is used. The support member 120 allows for curvature or flexure of the shrouded fluid-conducting apparatus 110 in the manner that is described in detail below. Accordingly, the shrouded fluid-conducting apparatus 110 may be used, for example, at corners or other locations where flexure or curvature is required.

Figure 8:
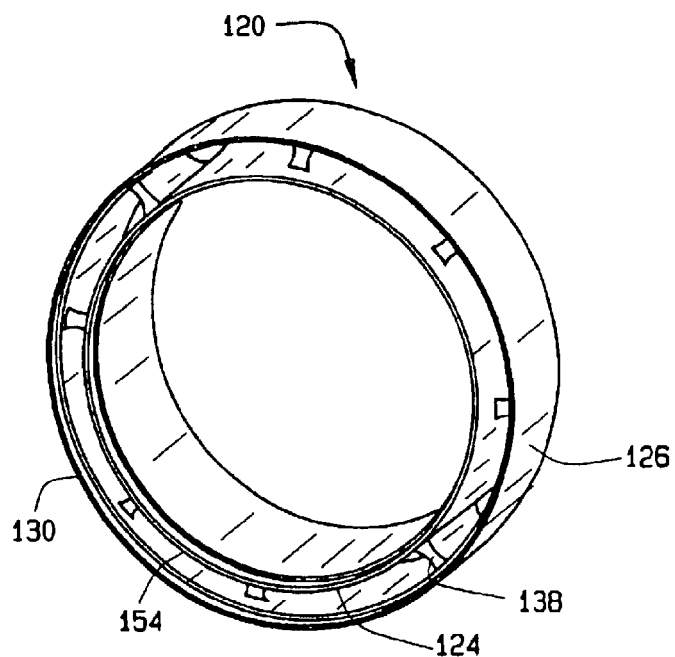
FIG. 8 is a perspective view of the second embodiment of the support member shown in FIGS. 5 through 7.
Figure 10:
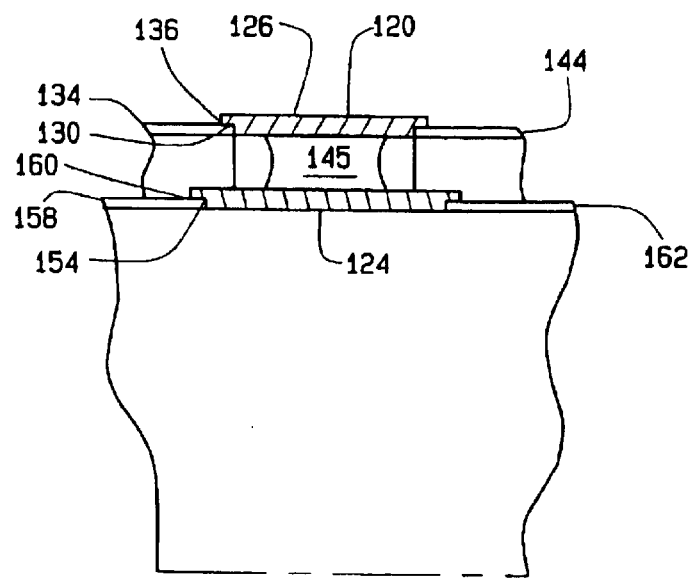
FIG. 10 is a detailed cross-sectional view of portions of the support member and inner and outer conduits of the shrouded fluid-conducting apparatus shown in FIG. 9.

FIG. 8 is a perspective view of the support member 120. As before with the first embodiment 20, the support member 120 may also comprise an inner ring-like member 124 and an outer ring-like member 126 that are separated by a spaced distance and accordingly define a leak detection passageway 145, as shown in FIG. 10. The leak detection passageway 145 allows for a fluid flow between the inner and outer ring-like members 124 and 126.

Figure 23:
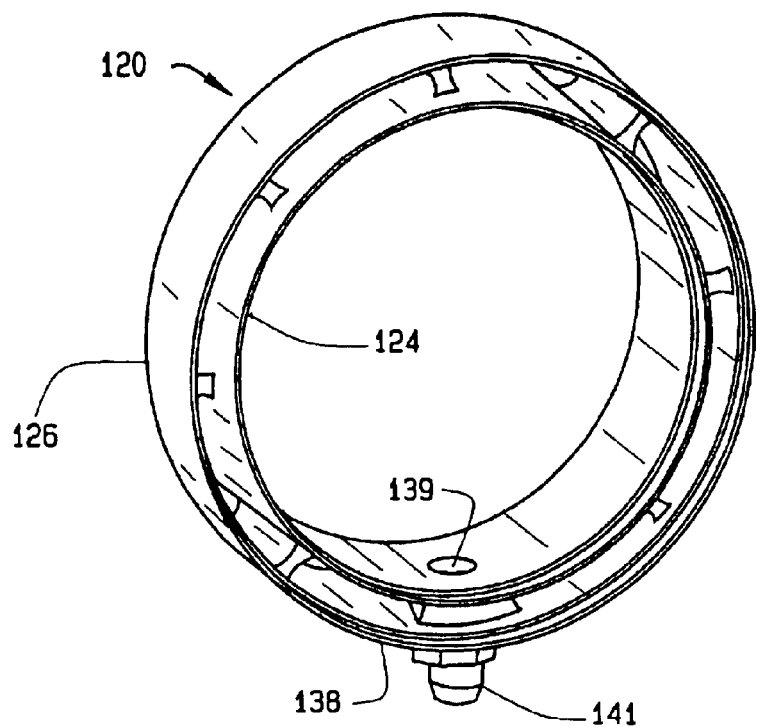
FIG. 23 is a perspective view of the support member shown in FIG. 8 illustrating a fin that is configured for installation of a portion of a fluid control system constructed in accordance with the principles of the present invention.
Figure 24:
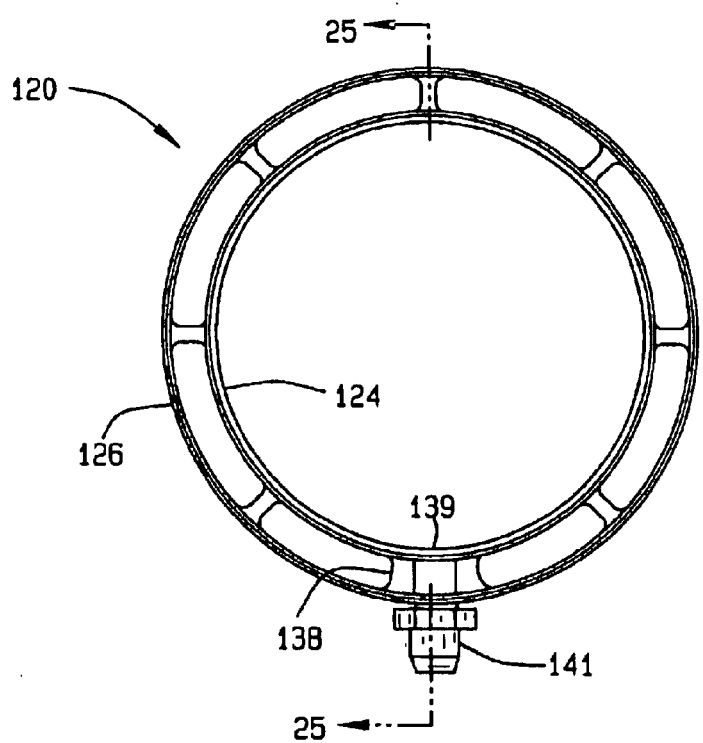
FIG. 24 is a frontal view of the support member shown in FIG. 23.
Figure 25:
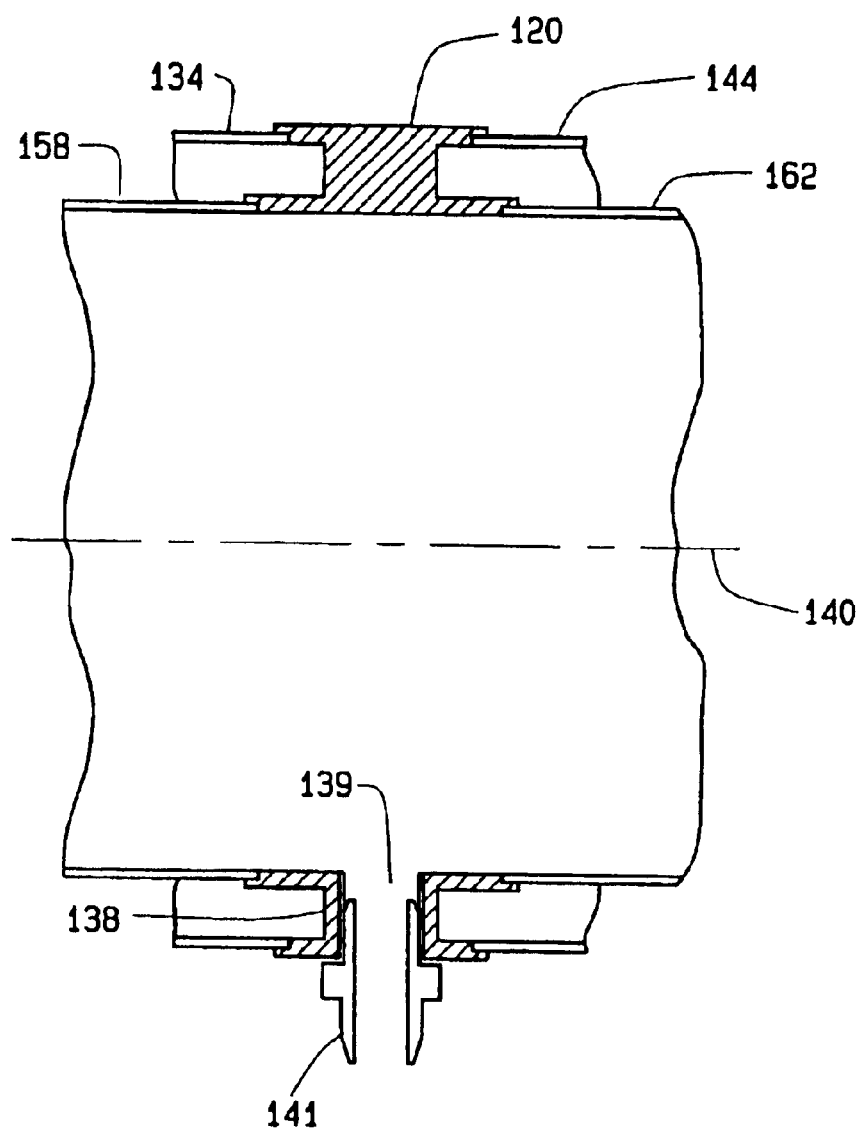
FIG. 25 is a cross-sectional view of the support member taken along the plane 25—25 shown in FIG. 24.

Referring back to FIG. 8, the support member 120 may also include a plurality of fins 138 that are disposed between the inner and outer ring-like members 124 and 126. In addition, at least one fin 138 may be configured for allowing installation of at least a portion or a component of a fluid control system therein. For example, the fin 138 may be sufficiently thick to allow a passageway (e.g., threaded hole or bore) to be provided therethrough. As shown in FIGS. 23 through 25, the shrouded fluid-conducting apparatus 10 may then be provided with a passageway 139 that extends through each of the outer ring-like member 126, the fin 138, and the inner ring-like member 124. The passageway 139 may then be used for installing the union or pipe coupling 141, among other components of a fluid control system.

Figure 9:
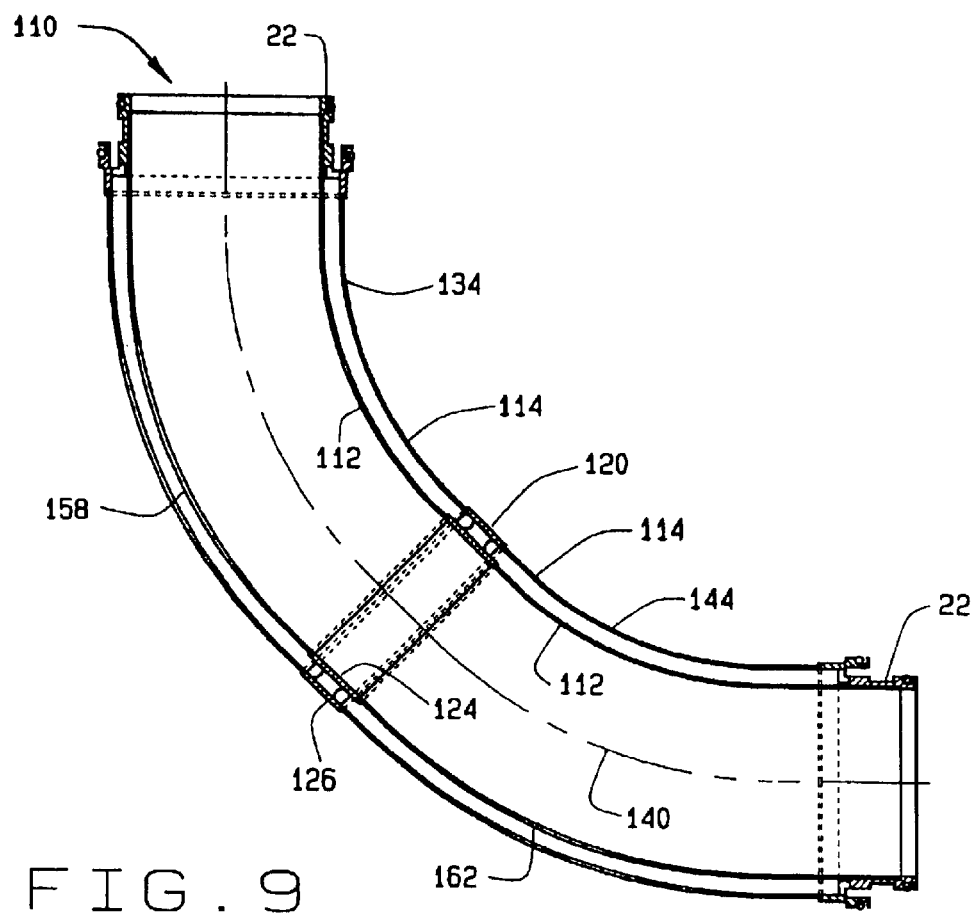
FIG. 9 is a cross-sectional view of the shrouded fluid-conducting apparatus taken along the plane 9—9 in FIG. 5.

FIG. 9 is a cross-sectional view of the shrouded fluid-conducting apparatus 110 taken along the plane 9—9 in FIG. 5. Although shown in FIG. 9, the manner in which the support member 120 is engaged with the inner and outer conduits 112 and 114 is best shown in FIG. 10. FIG. 10 is a detailed cross-sectional view of a portion (i.e., the portion disposed on a side of the center line 140) of the support member 120 shown engaged with the inner and outer conduits 112 and 114.

As shown in FIGS. 9 and 10, the outer ring-like member 126 may be provided with notches or weld sockets 130 sized to allow the outer conduit portions 134 and 144 to be welded therein. Accordingly, a compatible filler material may be used to weld (e.g., fillet weld, butt weld, etc.) the outer conduit portions 134 and 144 to the weld sockets 130, thus forming the weld joints 136.

Unlike the first embodiment 20, however, the inner ring-like member 124 of the support member 120 may also be provided with notches or weld sockets 154 sized to allow the inner conduit portions 158 and 162 to be welded therein. Accordingly, a compatible filler material may be used to weld (e.g., fillet weld, butt weld, etc.) the inner conduit portions 158 and 162 to the weld sockets 154, thus forming the weld joints 160. The weld sockets 154 provided in the inner ring-like member 124 may be essentially identical to the weld sockets 130 provided in the outer ring-like member 126, although such need not be the case.

The support member 120 and the conduits 112 and 114 may be assembled in the following manner. The inner conduit portion 158 and outer conduit portion 134 may be rotated about the center line 140 to their proper positions. While the inner and outer conduit portions 158 and 134 are being rotated about the center line 140, the end portions of the inner and outer conduit portions 158 and 134 may be kept square or flush with the support member 120. After the proper positioning has been obtained, the inner conduit portion 158 may be welded to the weld socket 154, and the outer conduit portion 134 may be welded to the weld socket 130.

Next, the inner and outer conduit portions 162 and 144 may be twisted or rotated about the center line 140 to their proper positions. Once the proper positions have been obtained for the inner and outer conduit portions 162 and 144, the inner and outer conduit portions 162 and 144 may then be welded to the respective weld sockets 154 and 130.

It should be noted, however, that the inner and outer conduits 112 and 114 may be attached to the support member 120 in ways other than welding as would be obvious to one having ordinary skill in the art after having become familiar with the teachings of the invention. For example, an adhesive may be used to attach the inner and outer conduits 112 and 114 to the support member 120.

To rotate the inner and outer conduits 112 and 114 with respect to the support member 120, a vice may be used. The support member 120 may be held fast or stationary within the vice while the conduits 112 and 114 are being rotated. Alternatively, other methods may be used to rotate the conduits 112 and 114 with respect to the support member 120 as would be obvious to one having ordinary skill in the art after having become familiar with the teachings of the present invention.

As before with the first embodiment 20, the support member 120 also preferably defines a leak detection passageway 145. The leak detection passageway 145 provides fluid communication between the outer conduit portions 134 and 144. That is, the leak detection passageway 145 allows a fluid to flow from the outer conduit portion 134 or 144 into the other outer conduit portion 134 or 144. Accordingly, the leak detection passageway 145 provides advantages similar to that provided by the leak detection passageway 45 which were described previously.

Any of a wide range of materials and manufacturing processes may be used to produce the support member 120. The selection of material may depend at least in part on the materials comprising the inner and outer conduits 112 and 114 and the manner in which the inner and outer conduits 112 and 114 will be engaged with the support member 120. The selection of manufacturing process may depend at least in part on the material that is selected for the support member 120. Preferably, the support member material is preferably compatible with the conduit material(s), the method used to engage the support member 120 with the inner and outer conduits 112 and 114, and the method used to make the support member 120. By way of example only, the support member 120 may comprise aluminum (e.g., 6061-T4 aluminum) or stainless steel and be formed by a machining or milling process.

As briefly described earlier and as shown in FIGS. 1 and 3, the shrouded fluid-conducting apparatus 10 has a shrouded end fitting 22 disposed at each of its opposed ends. The shrouded end fittings 22 are shown in detail in FIGS. 11 through 15.

Figure 11:
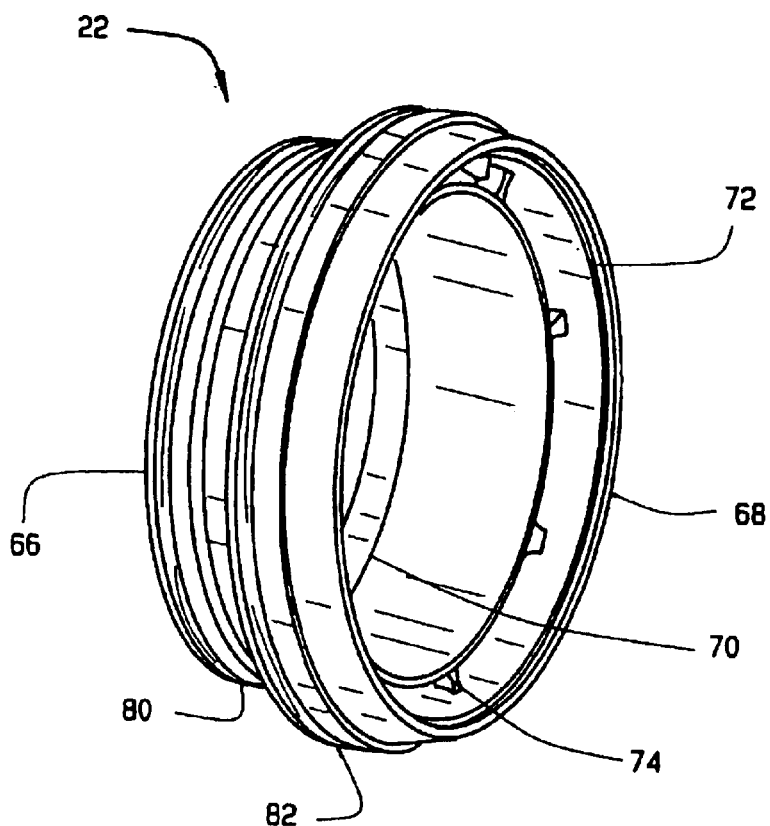
FIG. 11 is a perspective view of the shrouded end fitting shown in FIG. 1.
Figure 12:
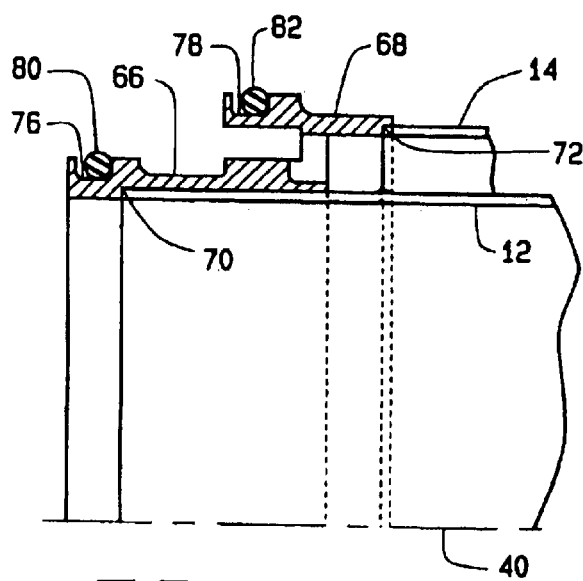
FIG. 12 is a detailed cross-sectional view of portions of the shrouded end fitting and inner and outer conduits of the shrouded fluid-conducting apparatus shown in FIG. 3.

FIG. 11 is a perspective view of the shrouded end fitting 22. As shown, the shrouded end fitting 22 preferably comprises a ferrule-like shape. More specifically, the shrouded end fitting 22 comprises an inner portion 66 and an outer portion 68 that are separated by a spaced distance. The inner and outer portions 66 and 68 may be provided with notches or weld sockets 70 and 72, respectively. As best shown in FIG. 12, the inner and outer conduits 12 and 14 may be welded (e.g., fillet weld, butt weld, etc.) into the weld sockets 70 and 72, respectively.

Referring back to FIG. 11, the shrouded end fitting 22 may further include a plurality of spokes, webs, or fins 74 that are disposed between the inner and outer portions 66 and 68. At least one of the fins 74 may be configured for allowing installation of at least a portion or component of a fluid control system therein. For example, the fin 74 may be sufficiently thick to allow a passageway (e.g., threaded hole) to be provided therethrough and into the inner conduit 12. The passageway may then be used to install a union or pipe coupling, a drain, a pressure regulator/monitor, among other components of a fluid control system in a manner similar to that shown in FIGS. 23 through 25, which illustrate the union 141 installed in the passageway 139 (e.g., threaded hole or bore) extending through the inner and outer ring-like members 124, 126 and the fin 138 of support member 120.

Any of wide range of materials and manufacturing processes may be used to produce the shrouded end fitting 22. The selection of material may depend at least in part on the materials comprising the inner and outer conduits 12 and 14 and the manner in which the inner and outer conduits 12 and 14 will be engaged with the shrouded end fitting 22. The selection of manufacturing process may depend at least in part on the material that is selected for the shrouded end fitting 22. Preferably, the material used for the shrouded end fitting 22 is compatible with the conduit material(s), the method used to engage the shrouded end fitting 22 with the inner and outer conduits 12 and 14, and the method used to make the shrouded end fitting 22. By way of example only, the shrouded end fitting 22 may comprise aluminum (e.g., 6061-T4 aluminum) or stainless steel and be formed by a machining or milling process.

FIG. 12 is detailed cross-sectional view showing portions of the inner and outer conduits 12 and 14 engaged with a portion of the shrouded end fitting 22 (i.e., the portion disposed above the center line 40 of the shrouded fluid-conducting apparatus 10). The inner and outer portions 66 and 68 of the shrouded end fittings 22 may each define a groove 76 and 78, respectively, in which is disposed respective o-rings 80 and 82. The o-rings 80 and 82 may assist with the fluidic sealing of the joint 84.

FIG. 13 is a perspective view showing a first embodiment of the joint 84 that may be used to engage the shrouded fluid-conducting apparatus 10 with an additional shrouded fluid-conducting apparatus 10'. The joint 84 may be relatively flexible to allow for expansion and contraction of the joint 84 as the need arises. For example, the shrouded fluid-conducting apparatus 10 and 10' may be disposed onboard a mobile platform (e.g., aircraft, train, bus, ship, etc.) wherein movement of the platform causes the need for at least some flexibility in the joint 84.

By allowing the shrouded fluid-conducting apparatus 10 to be engaged with additional shrouded fluid-conducting apparatus 10', greater flexibility is provided to the installer of the overall fluid-conducting system. During the installation process of a fluid-conducting system, tight places and corners are often encountered that require the installer to use shorter components. At such locations, the installer may use one or more shorter length shrouded fluid-conducting apparatus 10 and 10'. The present invention thus allows for the use of shorter shrouded fluid-conducting apparatus 10 in places where shorter conduit lengths are required but still allows for longer shrouded fluid-conducting apparatus 10 to be used in other places.

To allow for electrical grounding across the joint 84, a bonding jumper 86 (e.g., electrically conductive wire or strap, etc.) may be used in conjunction with loop-type bonding clamps 88 and 88' disposed circumferentially around the outer conduits 14 and 14', respectively. By providing the bonding jumper 86 and clamps 88, 88' across each joint (e.g., 84) in the fluid system, the entirety of the fluid-conducting system may be grounded when a single component of the fluid-conducting system is grounded.

FIG. 14 is a cutaway side view of the joint 84. Although shown in FIG. 14, the manner in which the shrouded fluid-conducting apparatus 10 and 10' are engaged with each other is best shown in FIG. 15. FIG. 15 is a detailed cutaway side view of a portion (i.e., the portion disposed below the center line 40) of the joint 84.

Referring to FIGS. 14 and 15, the joint 84 may be used to engage the shrouded fluid-conducting apparatus 10 and 10' with each other. As shown, the joint 84 comprises the shrouded end fittings 22 and 22'. The joint 84 further includes an inner and outer coupling assembly 90 and 92 and an inner and outer seal sleeve 94 and 96.

To assemble the joint 84, the shrouded end fittings 22 and 22' are first positioned adjacent one another. Next, the inner seal sleeve 94 is disposed around the o-rings 80 and 80' and portions 66 and 66' of the shrouded end fittings 22 and 22'. The inner coupling assembly 90 is then disposed or clamped around the inner seal sleeve 94, the shrouded end fitting portions 66 and 66' and the o-rings 80 and 80'. Accordingly, the inner coupling assembly 90 and inner seal sleeve 94 fluidically seal the junction between the inner conduits 12 and 12'.

Continuing with the joint 84 assembly process, the outer seal sleeve 96 is then disposed around the o-rings 82 and 82' and portions 68 and 68' of the shrouded end fittings 22 and 22'. Next, the outer coupling assembly 92 is disposed or clamped around the outer seal sleeve 96, the shrouded end fitting inner portions 68 and 68' and the o-rings 82 and 82'. Accordingly, the outer coupling assembly 92 and outer seal sleeve 96 fluidically seal the junction between the outer conduits 14 and 14'.

In addition, the inner and outer coupling assemblies 90 and 92 and the inner and outer seal sleeves 94 and 96 prevent, or at least hinder, axial movement of the shrouded fluid-conducting apparatus 10 and 10' away from each other.

The joint 84 also allows for fluid to be conducted from one inner conduit 12 or 12' to the other inner conduit 12 or 12' under a double failure condition in that two failures must occur before that fluid can reach the compartment (e.g., an aircraft "ignition zone") in which the shrouded fluid-conducted apparatus 10 or 10' are disposed. For example, if a failure allows the fluid within the inner conduit 12 or 12' to reach the outer conduit 14 or 14', the outer coupling assembly 92 and outer seal sleeve 96 do not allow the fluid within the outer conduit 14 or 14' to enter the compartment.

Preferably, the joint 84 allows the inner conduits 12 and 12' to be fluid communication with each other and also defines a leak detection passageway 98 that allows the outer conduits 14 and 14' to be in fluid communication with each other. The leak detection passageway 98 is preferably defined at least partially between the inner coupling assembly 90 and the outer seal sleeve 96. The leak detection passageway 98 allows a fluid to flow from the outer conduit 14 or 14' into the other outer conduit 14 or 14'. With the leak detection passageway 98, a leak detection system is not necessarily needed for each of the shrouded fluid-conducting apparatus 10 and 10'. Instead, a single leak detection system may be used to detect fluid in either of the outer conduits 14 or 14'.

Figure 16:
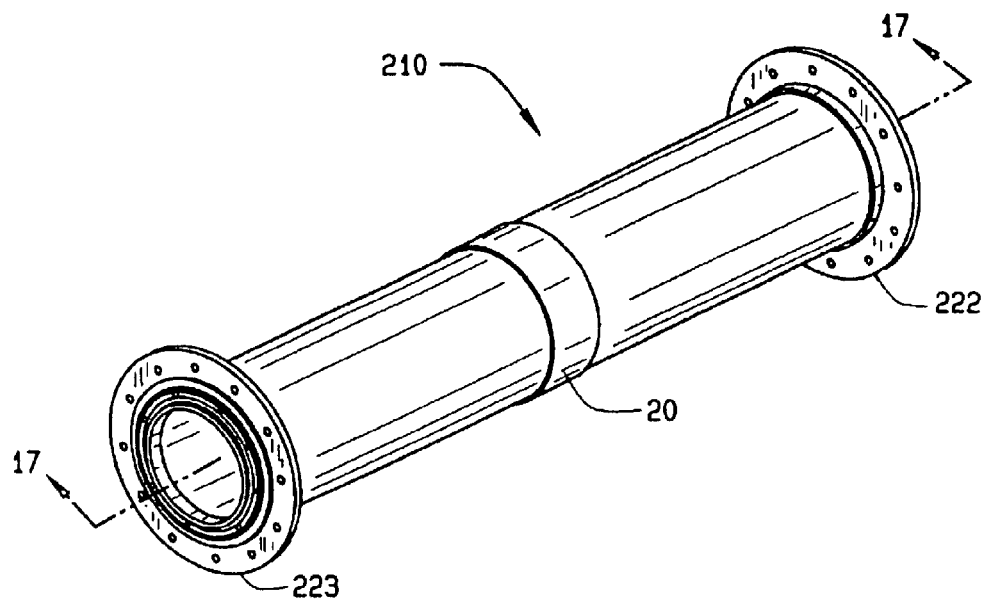
FIG. 16 is a perspective view of a third embodiment of the shrouded fluid-conducting apparatus constructed in accordance with the principles of the present invention.

FIG. 16 is a perspective view of a third embodiment of a shrouded fluid-conducting apparatus 210. As shown, the shrouded fluid-conducting apparatus 210 comprises a support member 20 and is substantially straight, as was the first embodiment 10. However, the shrouded fluid-conducting apparatus 210 includes shrouded end fittings 222 and 223 disposed at its ends.

Figure 17:
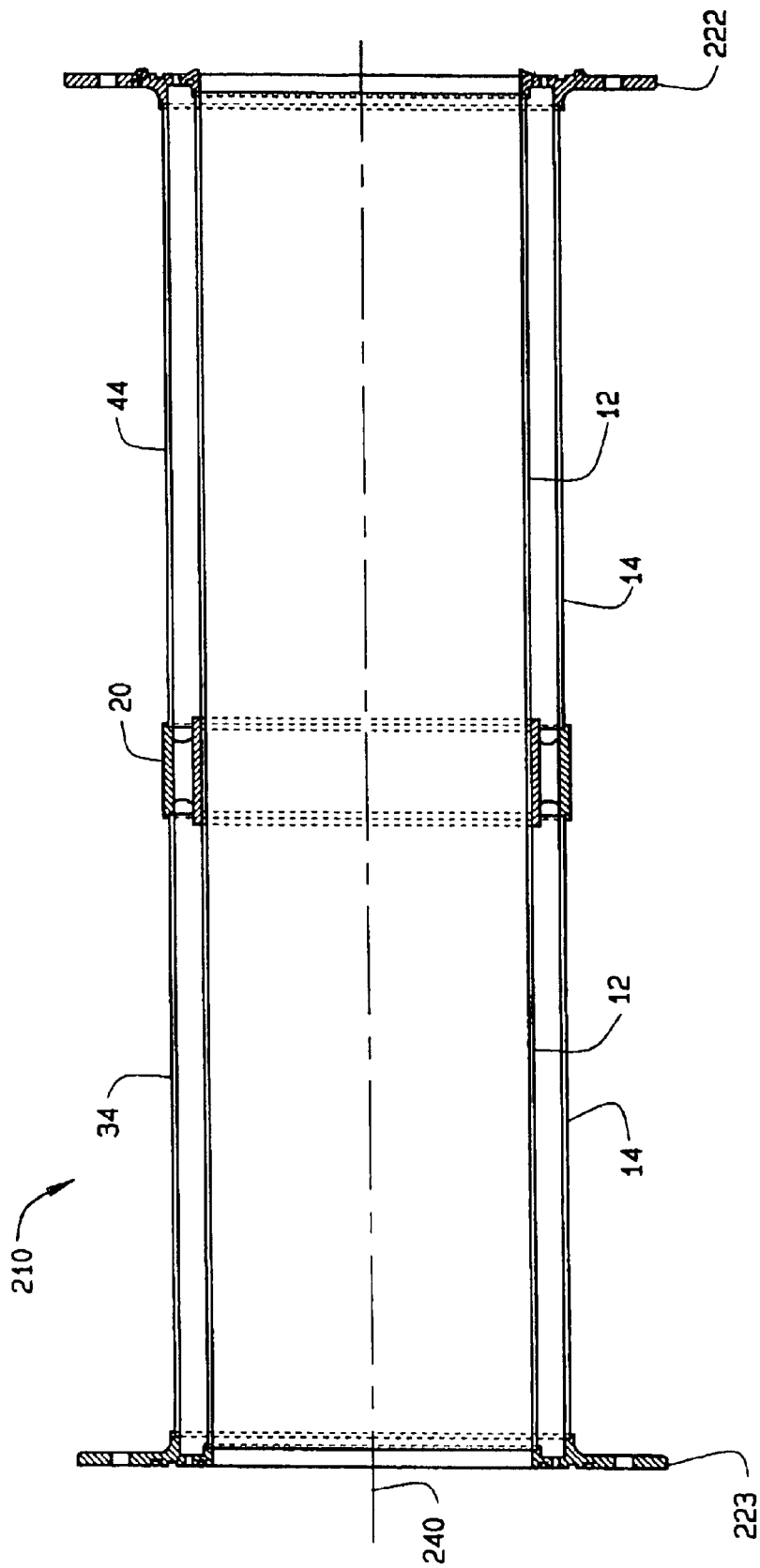
FIG. 17 is a cross-sectional view of the shrouded fluid-conducting apparatus taken along the plane 17—17 in FIG. 16.

FIG. 17 is a cross-sectional view of the shrouded fluid-conducting apparatus 210 taken along the plane 17—17 in FIG. 16. As before with the first embodiment 10 shown in FIG. 3, the shrouded fluid-conducting apparatus 210 comprises an inner conduit 12 and an outer conduit 14, wherein the outer conduit 14 includes first and second portions 34 and 44 disposed between the support member 20.

Figure 18:
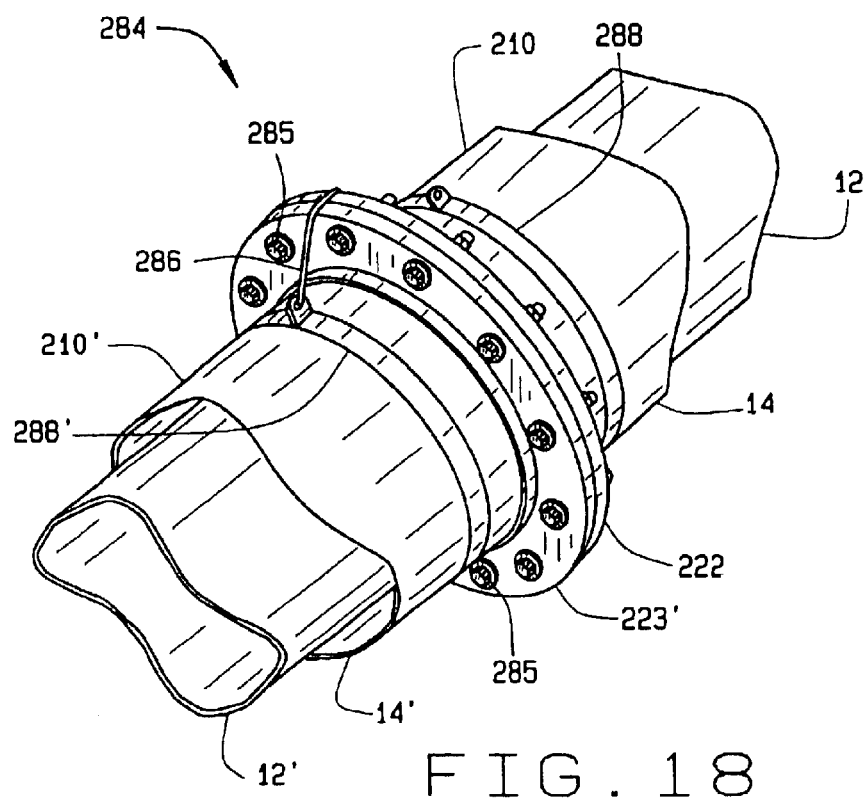
FIG. 18 is a perspective of a second embodiment of a joint that may be used to engage a shrouded fluid-conducting apparatus with an additional shrouded fluid-conducting apparatus in accordance with the principles of the present invention.

FIG. 18 is a perspective view showing a joint 284 that may be used to engage the shrouded fluid-conducting apparatus 210 with an additional shrouded fluid-conducting apparatus 210'. As shown, the joint 284 may comprise the shrouded end fittings 222 and 223' disposed at the respective ends of the shrouded fluid-conducting apparatus 210 and 210'. The shrouded end fittings 222 and 223' may be engaged with each other by way of mechanical fasteners 285 (e.g., lugs, device pins, single pin joints, screws, rivets, among others).

The joint 284 is preferably a relatively fixed joint that allows for the transfer of loads from one shrouded fluid-conducting apparatus 210 or 210' to the other and/or from the shrouded fluid-conducting apparatus 210 and 210' to an external component (e.g., ceiling joist, floor beam, other load-bearing structures, etc.). For example, it may be necessary for the fluid-conducting system to span across a large area such that either or both of the shrouded fluid conducting apparatus 210 or 210' may need to have considerable length. Or for example, the shrouded fluid-conducting apparatus 210 and 210' may be required to conduct a fluid at a relatively high pressure, thus requiring the inner conduits 12 and 12' to be fabricated from a relatively heavy material having sufficient strength to withstand the fluid pressures. In either case, the weight of the shrouded fluid-conducting apparatus 210 and 210' may be considerable, and the joint 284 may allow for the weight to be transferred or supported by an external component.

Figure 19:
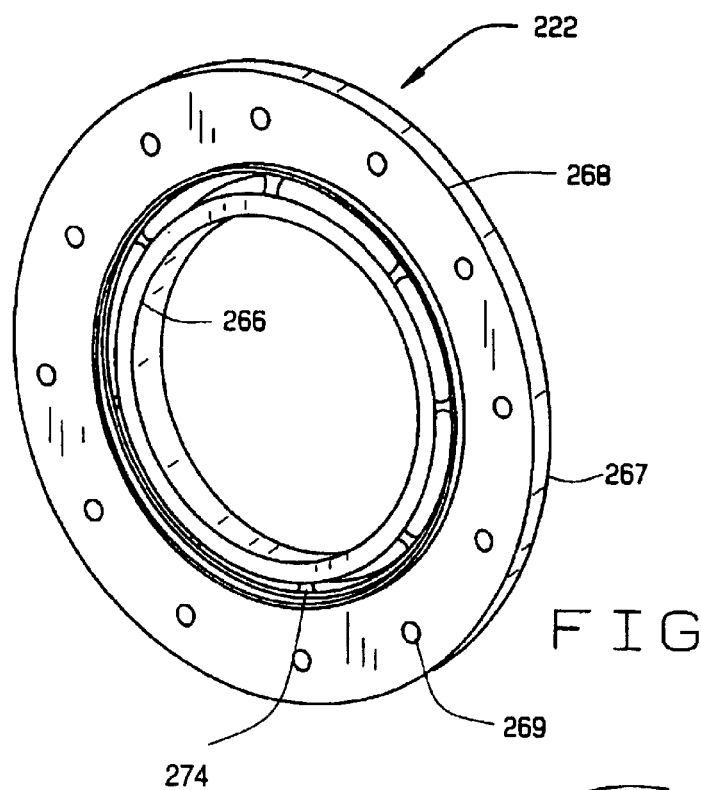
FIG. 19 is a perspective view of the shrouded end fitting that is shown disposed at an end of the shrouded fluid-conducting apparatus in FIG. 16.

FIG. 19 is a perspective view of the shrouded end fitting 222. As shown, the shrouded end fitting 222 comprises an inner portion 266 and an outer portion 268 that are separated by a spaced distance. The outer portion 268 preferably comprises a flange 267 that defines a plurality of holes 269 sized to receive the mechanical fasteners 285 therethrough. The shrouded end fitting 222 may further include a plurality of spokes, webs, or fins 274 that are disposed between the inner and outer portions 266 and 268.

Figure 20:
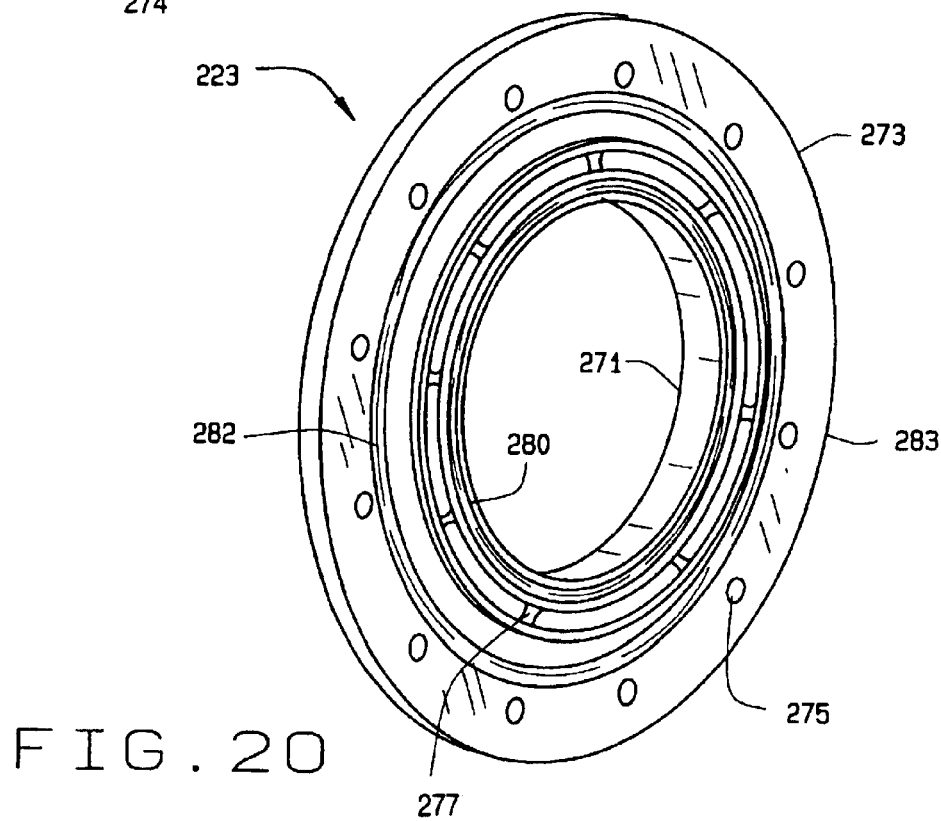
FIG. 20 is a perspective view of the shrouded end fitting that is shown disposed at another end of the shrouded fluid-conducting apparatus in FIG. 16 and that is engageable with the shrouded end fitting shown in FIG. 19.

FIG. 20 is a perspective view of the shrouded end fitting 223. As shown, the shrouded end fitting 223 comprises an inner portion 271 and an outer portion 273 that are separated by a spaced distance. The outer portion 273 preferably comprises a flange 283 that defines a plurality of holes 275 that are sized to receive the mechanical fasteners 285 therethrough. The shrouded end fitting 223 may further include a plurality of spokes, webs, or fins 277 that are disposed between the inner and outer portions 271 and 273.

One or more of the fins 274 and 277 of the shrouded end fittings 222 and 223, respectively, may be configured for allowing installation of at least a portion or a component of a fluid control system therein. That is, one or more of the fins 274 and 277 may be sufficiently thick to allow a passageway to be provided therethrough, which may then be used for installation of a union or pipe coupling, a drain, a pressure regulator, and/or other components of a fluid control system in a manner similar to that shown in FIGS. 23 through 25, which illustrate the union 141 installed in the passageway 139 extending through the inner and outer ring-like members 124, 126 and the fin 138 of support member 120.

Any of wide range of materials and manufacturing processes may be used to produce the shrouded end fittings 222, 223. The selection of material may depend at least in part on the materials comprising the inner and outer conduits 12 and 14 and the manner in which the inner and outer conduits 12 and 14 will be engaged with the shrouded end fittings 222, 223. The selection of manufacturing process may depend at least in part on the material that is selected for the shrouded end fittings 222, 223. Preferably, the material used for the shrouded end fittings 222, 223 is compatible with the conduit material(s), the method used to engage the shrouded end fittings 222, 223 with the inner and outer conduits 12 and 14, and the method used to make the shrouded end fittings 222, 223. By way of example only, the shrouded end fittings 222, 223 may comprise aluminum (e.g., 6061-T4 aluminum) or stainless steel and be formed by a machining or milling process.

Figure 21:
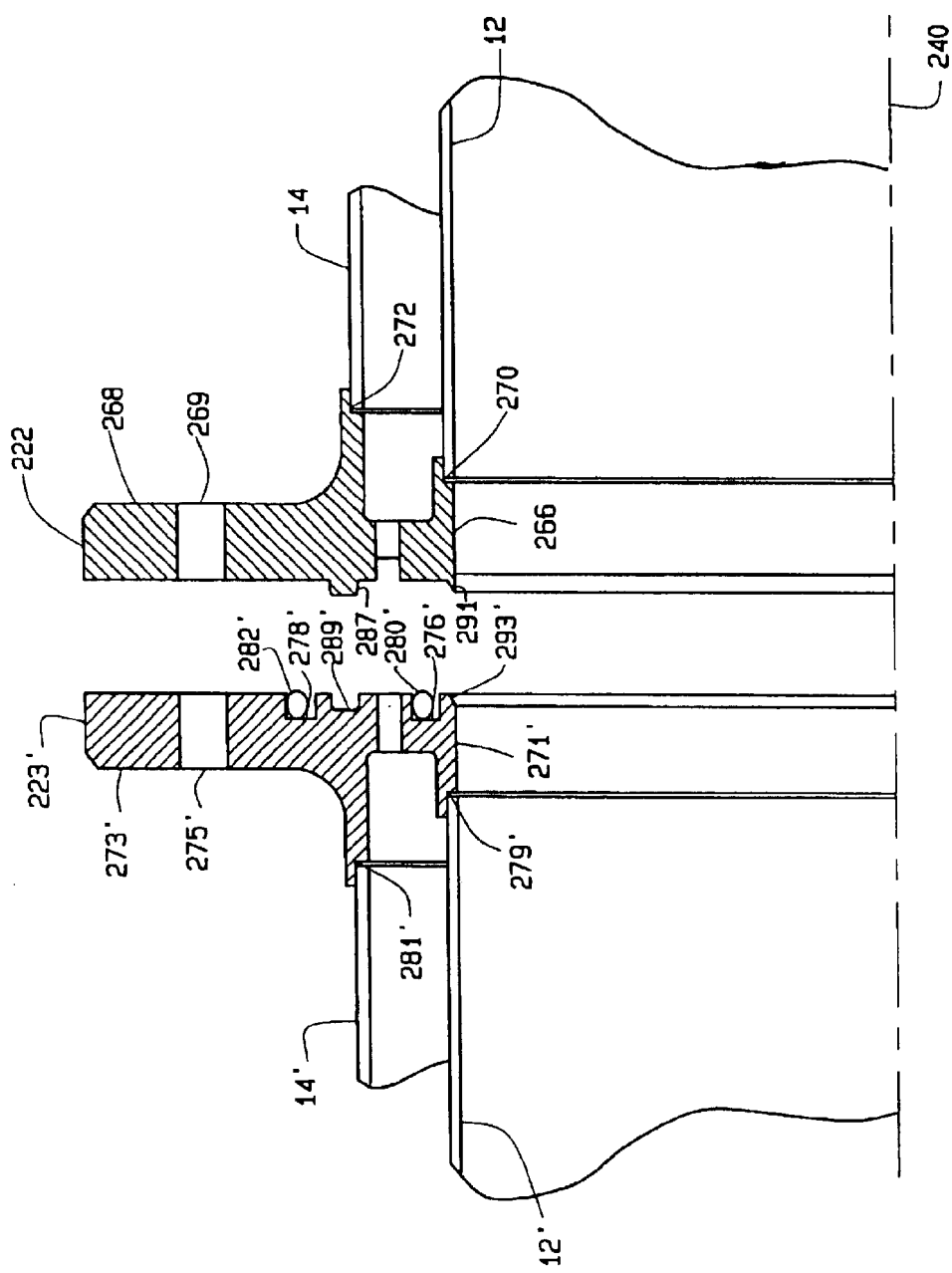
FIG. 21 is a cross-sectional side view illustrating the shrouded end fittings of FIGS. 19 and 20 aligned for engagement.

FIG. 21 is a cross-sectional side view illustrating a portion (i.e., the portion disposed above the center line 240) of the shrouded end fitting 222 of FIG. 19 aligned for engagement with a corresponding portion of a shrouded end fitting 223' disposed at an end of the shrouded fluid-conducting apparatus 210'. As shown, the inner and outer portions 266 and 268 of the shrouded end fitting 222 may be provided with notches or weld sockets 270 and 272 into which may be welded (e.g., fillet weld, butt weld, etc.) the inner and outer conduits 12 and 14, respectively. The inner and outer portions 273' and 275' of the shrouded end fitting 223' may also be provided with notches or weld sockets 279' and 281' into which may be welded (e.g., fillet weld, butt weld, etc.) the inner and outer conduits 12' and 14', respectively. Additionally, the inner and outer portions 273' and 275' of the shrouded end fittings 223' may each define a groove 276' and 278', respectively, in which is disposed respective o-rings 280' and 282'. The o-rings 280' and 282' may assist with the fluidic sealing of the joint 284.

To ensure proper alignment of the shrouded end fittings 222 and 223', the shrouded end fittings 222 and 223' may be shaped to interfit with one another in a keyed arrangement or one relation alignment. For example, the shrouded end fitting 222 may comprise an alignment tab or key 287 that is sized to fit within a notch or keyway 289' defined by the shrouded end fitting 223'. Or for example, the shrouded end fitting 222 may, additionally or alternatively, include a radial protrusion 291 that is disposed to engage a chamfered or beveled surface 293' defined by the shrouded end fitting 223'. In other embodiments, the shrouded end fitting 223' may be provided with the alignment tab and/or the radial protrusion, and the shrouded end fitting 222 may be provided with the notch and/or the chamfered surface.

Figure 22:
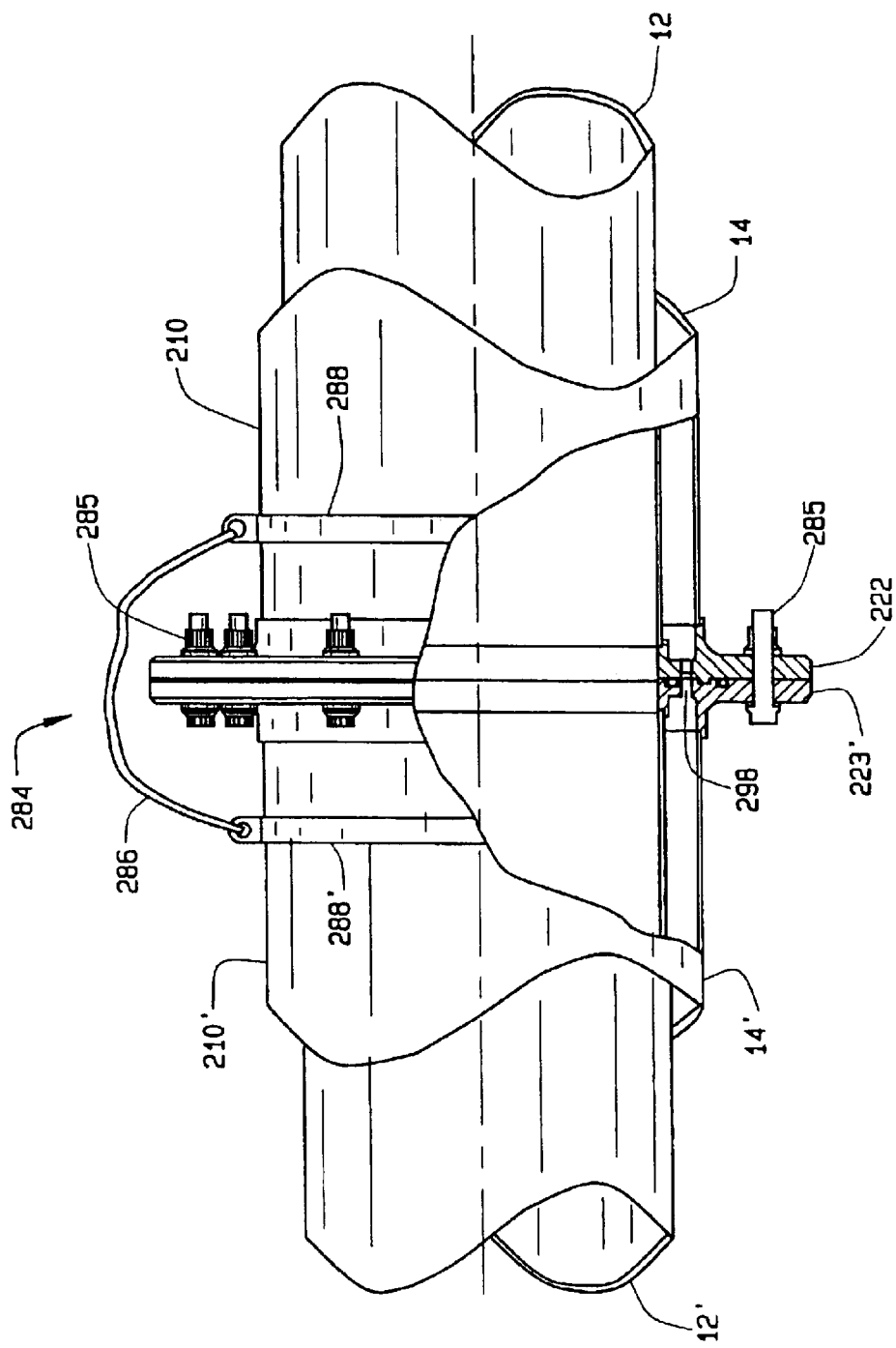
FIG. 22 is a cutaway side view of the joint shown in FIG. 18.

FIG. 22 is a cutaway side view of the joint 284. As shown, a bonding jumper 286 (e.g., wire, strap, etc.) may be used in conjunction with loop-type bonding clamps 288 and 288' disposed circumferentially around the outer conduits 14 and 14', respectively, to allow for electrical grounding across the joint 284. By providing the jumper wire 286 and clamps 288 and 288' across each joint (e.g., 284) in the fluid-conducting system, the entirety of the fluid system may be grounded when a single component of the fluid-conducting system is grounded.

Preferably, the joint 284 allows for fluid communication between the inner conduits 12 and 12' and also defines a leak detection passageway 298 that allows for fluid communication between the outer conduits 14 an 14'. With the leak detection passageway 298, a leak detection system is not necessarily needed for each of the shrouded fluid-conducting apparatus 210 and 210'. Instead, a single leak detection system may be used to detect fluid in either of the outer conduits 14 or 14'.

In a fourth embodiment of the shrouded fluid-conducted apparatus that is not shown, the shrouded fluid-conducting apparatus may include the support member 120 and the shrouded end fittings 222 and 223.

It should be noted that any of the aforementioned embodiments of the shrouded fluid-conducting apparatus 10, 110, 210 may be used to provide a coaxial fluid flow. That is, the inner and outer conduits 12, 112 and 14, 114 of the shrouded fluid-conducting apparatus 10, 110, 210 may both be used to transport fluids at the same time. Moreover, the fluids being conducted by the inner conduit 12, 112 and the outer conduit 14, 114 may be either the same fluid or different fluids. In addition, the fluids may be conducted in either the same or different directions. For example, the inner conduit 12 of the shrouded fluid-conducting apparatus 10 may be used as fluid supply conduit, while the outer conduit 14 is used as a fluid return conduit.

Dimensionally, in one preferred embodiment, the inner conduit 12 is sized such that its inner diameter is about 4.87 inches (12.37 cm), its outer diameter is about 5.0 inches (12.7 cm), and its wall thickness is about 0.065 inches (0.165 cm). The outer conduit 14 is sized such its inner diameter is about 5.87 inches (14.91 cm), its outer diameter is about 6.0 inches (15.24 cm), and its wall thickness is about 0.065 inches (0.165 cm). The support member 20, 120 is sized such that its inner diameter is about 4.87 inches (12.37 cm) and its minimum outer diameter is about 6.14 inches (15.6 cm), which may be increased to accommodate for support features such as lugs, device pins, etc. The shrouded end fitting 22, 222, 223 is sized such that its inner diameter is about 4.87 inches (12.37 cm) and its outer diameter is about 6.51 inches (16.54 cm). Accordingly, the shrouded fluid-conducting apparatus 10 is compatible with the standard-sized aerial refueling manifolds currently being used.

In another preferred embodiment, the inner conduit 12 is sized such that its inner diameter is about 3.92 inches (9.96 cm), its outer diameter is about 4.0 inches (10.16 cm), and its wall thickness is about 0.042 inches (0.107 cm). The outer conduit 14 is sized such that its inner diameter is about 4.87 inches (12.37 cm), its outer diameter is about 5.0 inches (12.7 cm), and its wall thickness is about 0.042 inches (0.107 cm). The support member 20, 120 is sized such that its inner diameter is about 3.87 inches (9.83 cm) and its minimum outer diameter is about 5.14 inches (13.06 cm), which may be increased to accommodate for support features such as lugs, device pins, etc. The shrouded end fitting 22, 222, 223 is sized such that its inner diameter is about 3.87 inches (9.83 cm) and its outer diameter is about 5.51 inches (14 cm).

It should be noted, however, that the present invention is not limited to any particularly sized inner and/or outer conduit. That is, other conduit sizes may be employed without departing from the spirit and scope of the present invention.

In another form, the present invention provides a method of manufacturing or making a shrouded fluid-conducting apparatus. Generally, the method comprises the steps of: disposing an inner conduit within an outer conduit; engaging a support member with the inner and outer conduits; and engaging at least one shrouded end fitting with an end of the shrouded fluid-conducting apparatus.

According to one preferred embodiment, the method of making the shrouded fluid-conducting apparatus 10, 210 preferably comprises the following steps. The support member 20 and the shrouded end fittings 22, 222, 223 are made (e.g., machined, milled, among other manufacturing processes) from an appropriate material (e.g., aluminum, stainless steel, composites, among other materials). The support member 20 is slidably positioned around a portion of the inner conduit 12. A compatible filler material is used to weld the support member 20 to the inner conduit 12. The outer conduit portions 34, 44 are slidably positioned over the respective portions of the inner conduit 12 that extend outwardly from each side of the support member 20. A compatible filler material is used to weld the outer conduit portions 34, 44 to the weld sockets 30 defined by the outer ring-like member 26 of the support member 20. The appropriate shrouded end fitting 22, 222, 223 is then welded to each end of the shrouded fluid-conducting apparatus 10, 210. Finally, the shrouded fluid-conducting apparatus 10, 210 is proof pressure tested.

In another preferred embodiment, the method of making the shrouded fluid-conducting apparatus 110 preferably comprises the following steps. The support member 120 and the shrouded end fittings 22, 222, 223 are made from an appropriate material (e.g., aluminum, stainless steel, among others). The inner and outer conduit portions 158, 162, 134, 144 are assembled to the support member 120 in the manner previously described. The appropriate shrouded end fitting 22, 222, 223 are then welded to each end of the shrouded fluid-conducting apparatus 110. Finally, the shrouded fluid-conducting apparatus 110 is proof pressure tested.

In yet another form, the present invention provides a method for conducting fluid. Generally, the method comprises the steps of: shrouding an inner conduit 12, 112, for example, by disposing the inner conduit 12, 112, within an outer conduit 14, 114; allowing the inner conduit 12, 112, to transfer a load to an external component; placing the inner conduit 12, 114 in fluid communication with at least one other fluid-conducting apparatus (e.g., the inner conduit 12', 112' of the shrouded fluid-conducting apparatus 10', 110', 210'); and delivering fluid to the inner conduit 12, 112. To allow for coaxial fluid flow, the method may further comprise the step of delivering fluid to the outer conduit 14, 114.

Accordingly, the present invention provides a shrouded fluid-conducting apparatus that may be used to conduct fuel through an FAA classified "ignition zone" of an aircraft in an FAA-compliant manner. By using the shrouded fluid-conducting apparatus of the present invention, fuel may be transported through an aircraft "ignition zone" or through other places under a double failure condition.

Previously, the FAA regulations allowed fuel to be conducted through single-wall conduits. However, the FAA regulations now require that fuel being transported through aircraft "ignition zones" must be contained within a shrouded conduit so that no single failure (e.g., leak or rupture of a conduit) will jeopardize the safe operation of an aircraft. By installing or retrofitting aircraft with the shrouded fluid-conducting apparatus of the present invention, the aircraft will satisfy the FAA regulations pertaining to the use of shrouded fuel lines. For example, the shrouded fluid-conducting apparatus may be installed or retrofitted onto existing aircraft such as the B-747® family of aircraft (e.g., E-4B, 747–200B, among others), the B-767® family of aircraft (e.g., Global Tanker Transport Aircraft (GTTA), AWACS Airborne Warning and Control System, among others), and/or the B-737® family of aircraft (e.g., Wedge tail, among others) from The Boeing Company. By retrofitting any of these existing aircraft with the shrouded fluid-conducting apparatus, the aircraft will be capable of being FAA certified by means of a Supplemental Type Certificate (STC). The shrouded fluid-conducting apparatus is also qualified for military applications under existing military standards.

In addition, the support members and joints each define leak detection passages used in conjunction with the shrouded fluid-conducting apparatus each define leak detection passageways. These leak detection passageways allow a single leak detection system to detect leaks across a plurality of shrouded fluid-conducting apparatus.

The joints also have advantages associated with them. For example, the joint 84 provides a relatively flexible connection that is able to expand and contract as the need arises. Or for example, the joint 284 provides a relatively fixed connection that allows for the transfer of loads across the joint 284 from one shrouded fluid-conducting apparatus to another and/or from one shrouded fluid-conducting apparatus to an external component.

The present invention also allows the shrouded fluid-conducting apparatus to be removed and/or replaced as a single unit. Accordingly, the shrouded fluid-conducting apparatus may be conveniently removed and/or replaced without having to remove surrounding support structure or other components of the overall fluid-conducting system of which the shrouded fluid-conducting apparatus is a part.

Moreover, the present invention also allows for various lengths, sizes (e.g., inner and outer diameters), and shapes (e.g., straight, curved) to be used for the shrouded fluid-conducting apparatus. For example, an installer may select a shrouded fluid-conducting apparatus having an appropriate length, curvature or flexure to accommodate for tight places, corners, and/or immovable objects around which the shrouded fluid-conducting apparatus must be positioned. Accordingly, the present invention provides great flexibility to the installer of the shrouded fluid-conducting apparatus. Indeed, the shrouded fluid-conducting apparatus can be tailored to any of a wide range of fluid-conducting systems.

The shrouded fluid-conducting apparatus is also more economical to manufacture than the shrouded conduits presently recognized in the art. Moreover, the present invention also allows for the use of standard bend radii with the shrouded fluid-conducting apparatus and for the use of currently existing tube clamps (e.g., bonding clamps 88, 288), tube supports, and tube mounting means. Accordingly, the shrouded fluid-conducting apparatus can be easily retrofit to other fluid-conducting systems in aircraft, among other locations.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A shrouded fluid-conducting apparatus, comprising:
   at least one outer conduit;
   at least one inner conduit disposed within the at least one outer conduit;
   at least one support member engaged with the at least one inner and outer conduits; and
   a shrouded end fitting disposed at each end of the shrouded fluid-conducting apparatus, each said shrouded end fitting being engageable with a corresponding shrouded end fitting at an end of another shrouded fluid-conducting apparatus to form a removable connection, enabling the shrouded fluid-conducting apparatus to be individually installed between and removed from between the two other shrouded fluid-conducting apparatus.

2. The shrouded fluid-conducting apparatus of claim 1, wherein the at least one outer conduit is sized to allow a fluid flow therethrough and between the at least one outer conduit and the at least one inner conduit.

3. The shrouded fluid-conducting apparatus of claim 1, wherein the at least one support member defines a leak detection passageway.

4. The shrouded fluid-conducting apparatus of claim 3, wherein the at least one support member comprises:
an inner member engaged with the at least one inner conduit;
an outer member engaged with the at least one outer conduit, the inner and outer members being separated by a spaced distance to define the leak detection passageway therebetween; and
at least one fin disposed between the inner and outer members.

5. The shrouded fluid-conducting apparatus of claim 4, wherein:
the inner member of the at least one support member is disposed circumferentially around a portion of the at least one inner conduit; and
the at least one outer conduit comprises a first portion and a second portion, each of which is welded into weld sockets defined by the outer member of the at least one support member.

6. The shrouded fluid-conducting apparatus of claim 5, wherein the inner member of the at least one support member defines weld sockets in which corresponding portions of the at least one inner conduit are welded.

7. The shrouded fluid-conducting apparatus of claim 4, wherein at least one fin of the at least one support member defines a passageway therethrough in which is installed at least a portion of a fluid control system.

8. The shrouded fluid-conducting apparatus of claim 1, wherein the at least one support member is configured to allow for curvature of at least a portion of the shrouded fluid-conducting apparatus.

9. The shrouded fluid-conducting apparatus of claim 8, wherein:
the at least one support member comprises:
an inner member that defines at least one weld socket; and
an outer member that defines at least one weld socket;
the at least one inner conduit comprises at least one curved portion engaged with the at least one weld socket of the inner member; and
the at least one outer conduit comprises at least one curved portion engaged with the at least one weld socket of the outer member.

10. The shrouded fluid-conducting apparatus of claim 1, wherein the shrouded end fitting defines at least a portion of a leak detection passageway.

11. The shrouded fluid-conducting apparatus of claim 10, wherein the shrouded end fitting comprises:
an inner portion defining a weld socket in which is welded an end portion of the at least one inner conduit;
an outer portion defining a weld socket in which is welded an end portion of the at least one outer conduit, the inner and outer portions being separated by a spaced distance to define the portion of the leak detection passageway; and
at least one fin disposed between the inner and outer portions.

12. The shrouded fluid-conducting apparatus of claim 11, wherein at least one fin of the shrouded end fitting defines a passageway therethrough in which is installed at least a portion of a fluid control system.

13. The shrouded fluid-conducting apparatus of claim 1, wherein the shrouded end fitting comprises a flange defining at least one hole sized to receive a mechanical fastener therein.

14. The shrouded fluid-conducting apparatus of claim 1, wherein:
the shrouded end fitting is engageable with the corresponding shrouded end fitting disposed at the end of the another shrouded fluid-conducting apparatus to form at least a portion of a joint disposed between the shrouded fluid-conducting apparatus and the another shrouded fluid-conducting apparatus;
the joint allows for fluid communication between the at least one inner conduit of the shrouded fluid-conducting apparatus and an inner conduit of the another fluid-conducting apparatus; and
the joint defines a leak detection passageway allowing for fluid communication between the at least one outer conduit of the shrouded fluid-conducting apparatus and an outer conduit of the another shrouded fluid-conducting apparatus.

15. The shrouded fluid-conducting apparatus of claim 14, wherein the shrouded end fitting is shaped to interfit with the corresponding shrouded end fitting in a keyed arrangement.

16. The shrouded fluid-conducting apparatus of claim 1 wherein:
the shrouded fluid-conducting apparatus is coupled to supporting structure within an aircraft; and
the at least one inner conduit is in communication with a source of fuel to communicate the fuel through the at least one inner conduit.

17. The shrouded fluid-conducting apparatus of claim 1, wherein:
the shrouded fluid-conducting apparatus is coupled to supporting structure within an ignition zone of an aircraft; and
the at least one inner conduit is in communication with a source of fuel to communicate the fuel through the ignition zone.

18. A shrouded fluid-conducting apparatus, comprising:
at least one outer conduit;
at least one inner conduit disposed within the at least one outer conduit;
at least one support member engaged with the at least one inner and outer conduits;
at least one shrouded end fitting disposed at an end of the shrouded fluid-conducting apparatus;
wherein the shrouded end fitting is engageable with a corresponding shrouded end fitting disposed at an end of an additional shrouded fluid-conducting apparatus to form at least a portion of a joint disposed between the shrouded fluid-conducting apparatus and the additional shrouded fluid-conducting apparatus;
wherein the joint allows for fluid communication between the at least one inner conduit of the shrouded fluid-conducting apparatus and an inner conduit of the additional fluid-conducting apparatus;
wherein the joint comprises:
the engaged shrouded end fittings;
an inner seal sleeve disposed around an inner portion of the engaged shrouded end fittings;
an inner coupling assembly disposed around the inner seal sleeve;
an outer seal sleeve disposed around an outer portion of the engaged shrouded end fittings; and an outer coupling assembly disposed around the outer seal sleeve, the leak detection passageway being defined between the inner coupling assembly and the outer seal sleeve.

19. A shrouded fluid-conducting apparatus, comprising:

at least one outer conduit;

at least one inner conduit disposed within the at least one outer conduit;

at least one shrouded end fitting disposed at an end of the shrouded fluid-conducting apparatus, the at least one shrouded end fitting defining at least a portion of a leak detection passageway, the at least one shrouded end fitting being engageable with a corresponding shrouded end fitting disposed at an end of another shrouded fluid-conducting apparatus to form at least a portion of a joint that allows a fluid to be communicated between the at least one inner conduit of the shrouded fluid-conducting apparatus and an inner conduit of the another shrouded fluid-conducting apparatus;

wherein the joint includes the engaged shrouded end fittings, an inner seal sleeve disposed around an inner portion of the engaged shrouded end fittings, an inner coupling assembly disposed around the inner seal sleeve, an outer seal sleeve disposed around an outer portion of the engaged shrouded end fittings, and an outer coupling assembly disposed around the outer seal sleeve, and a leak detection passageway being defined between the inner coupling assembly and the outer seal sleeve.

20. A shrouded fluid-conducting apparatus, comprising:

at least one outer conduit;

at least one inner conduit disposed within the at least one outer conduit;

at least one support member including an inner member engaged with the at least one inner conduit, and an outer member defining weld sockets in which corresponding portions of the at least one outer conduit are welded, the inner and outer members being separated by a spaced distance to define a leak detection passageway therebetween, the at least one support member enabling transfer of loads from the at least one inner conduit to one or more components external to the shrouded fluid-conducting apparatus, wherein:

the shrouded fluid-conducting apparatus is coupled to supporting structure within an aircraft; and the at least one inner conduit is in communication with a source of fuel to communicate the fuel through the at least one inner conduit.

21. The shrouded fluid-conducting apparatus of claim 20, wherein:

the shrouded fluid-conducting apparatus is coupled to supporting structure within an ignition zone of the aircraft; and the at least one inner conduit is in communication with a source of fuel to communicate the fuel through the ignition zone.

22. A shrouded end fitting, comprising:

an outer portion defining a weld socket in which is weldable an end portion of an outer conduit;

an inner portion defining a weld socket in which is weldable an end portion of an inner conduit disposed within the outer conduit, the inner and outer portions being separated by a spaced distance to define at least a portion of a leak detection passageway;

at least one fin disposed between the inner and outer portions;

wherein:

the shrouded end fitting is engageable with a corresponding shrouded end fitting disposed at an end of a shrouded fluid-conducting apparatus to form at least a portion of a joint that allows a fluid to be communicated between the inner conduit and an inner conduit of the shrouded fluid-conducting apparatus; and the joint includes:

the engaged shrouded end fittings;

an inner seal sleeve disposed around the inner portions of the engaged shrouded end fittings;

an inner coupling assembly disposed around the inner seal sleeve;

an outer seal sleeve disposed around the outer portions of the engaged shrouded end fittings;

an outer coupling assembly disposed around the outer seal sleeve; and a leak detection passageway defined between the inner coupling assembly and the outer seal sleeve.

23. A method of making a shrouded fluid-conducting apparatus, the method comprising:

coupling a support member to an inner conduit;

slidably positioning first and second portions of an outer conduit over the inner conduit;

welding the first and second portions of the outer conduit into corresponding weld sockets defined by the support member; and coupling a shrouded end fitting to the inner and outer conduits at each end of the shrouded fluid-conducting apparatus.

24. The method of claim 23, wherein coupling a support member to an inner conduit comprises slidably positioning the support member over the inner conduit such that the inner conduit extends outwardly from each side of the support member.

25. The method of claim 23, wherein coupling a support member to an inner conduit comprises welding corresponding portions of the inner conduit into the corresponding weld sockets defined by the support member.

26. The method of claim 23, wherein coupling a shrouded end fitting to the inner and outer conduits comprises welding the inner and outer conduits into corresponding weld sockets defined by the shrouded end fitting.

27. The method of claim 23, further comprising:

engaging one of the shrouded end fittings with a corresponding shrouded end fitting coupled to another shrouded fluid-conducting apparatus;

disposing an inner seal sleeve around an inner portion of the engaged shrouded end fittings;

disposing an inner coupling assembly around the inner seal sleeve, disposing an outer seal sleeve around an outer portion of the engaged shrouded end fittings; and disposing an outer coupling assembly around the outer seal sleeve;

wherein a leak detection passageway is defined between the inner coupling assembly and the outer seal sleeve.

28. The method of claim 23, further comprising:

coupling the shrouded fluid-conducting apparatus to supporting structure within an aircraft;

placing the inner conduit in communication with a source of fuel; and delivering fuel from the source to the inner conduit to communicate the fuel through the inner conduit.

29. The method of claim 23, further comprising:

coupling the shrouded fluid-conducting apparatus to supporting structure within an ignition zone of an aircraft;

placing the inner conduit in communication with a source of fuel; and delivering fuel from the source to the inner conduit to communicate the fuel through the ignition zone.

30. A method of conducting fluid, the method comprising:

shrouding an inner conduit;

removably coupling the inner conduit between at least two other fluid-conducting apparatus to allow the inner conduit to transfer a load to an external component and to place the inner conduit in fluid communication with the other fluid-conducting apparatus;

coupling the inner conduit to supporting structure within an aircraft;

placing the inner conduit in communication with a source of fuel; and delivering fuel from the source to the inner conduit to communicate the fuel through the inner conduit.

31. The method of claim 30, wherein coupling the inner conduit to supporting structure comprises coupling the inner conduit to supporting structure within an ignition zone of an aircraft; and wherein delivering fuel from the source to the inner conduit comprises delivering fuel from the source to the inner conduit to communicate the fuel through the ignition zone.

32. The method of claim 30, wherein the step of shrouding an inner conduit comprises disposing the inner conduit within an outer conduit.

33. The method of claim 30, further comprising the step of delivering fluid to the outer conduit.

34. A method of conducting fluid, the method comprising:

shrouding an inner conduit;

removably coupling the inner conduit between at least two other fluid-conducting apparatus to allow the inner conduit to transfer a load to an external component and to place the inner conduit in fluid communication with the other fluid-conducting apparatus;

delivering fluid to the inner conduit; wherein removably coupling the inner conduit comprises:

engaging a shrouded end fitting coupled to the inner conduit with a corresponding shrouded end fitting coupled to one of the other shrouded fluid-conducting apparatus;

disposing an inner seal sleeve around an inner portion of the engaged shrouded end fittings;

disposing an inner coupling assembly around the inner seal sleeve;

disposing an outer seal sleeve around an outer portion of the engaged shrouded end fittings; and disposing an outer coupling assembly around the outer seal sleeve;

wherein a leak detection passageway is defined between the inner coupling assembly and the outer seal sleeve.

\* \* \* \* \*